United States Patent
LeBlanc

(10) Patent No.: US 8,379,779 B2
(45) Date of Patent: *Feb. 19, 2013

(54) ECHO CANCELLATION FOR A PACKET VOICE SYSTEM

(75) Inventor: Wilfrid LeBlanc, Vancouver (CA)

(73) Assignee: Broadcom Corporation, Irvine, CA (US)

(*) Notice: Subject to any disclaimer, the term of this patent is extended or adjusted under 35 U.S.C. 154(b) by 1074 days.

This patent is subject to a terminal disclaimer.

(21) Appl. No.: 12/353,099

(22) Filed: Jan. 13, 2009

(65) Prior Publication Data

US 2009/0154380 A1 Jun. 18, 2009

Related U.S. Application Data

(63) Continuation of application No. 10/736,349, filed on Dec. 15, 2003, now Pat. No. 7,477,682, which is a continuation-in-part of application No. 10/313,367, filed on Dec. 6, 2002, now Pat. No. 7,283,585.

(60) Provisional application No. 60/414,059, filed on Sep. 27, 2002, provisional application No. 60/414,460, filed on Sep. 27, 2002, provisional application No. 60/414,492, filed on Sep. 27, 2002, provisional application No. 60/414,491, filed on Sep. 27, 2002, provisional application No. 60/414,493, filed on Sep. 27, 2002.

(51) Int. Cl.
*H03D 1/04* (2006.01)
(52) U.S. Cl. .................... 375/346; 375/222
(58) Field of Classification Search .......... 375/219, 375/222, 224, 227, 228, 316, 317, 318, 377, 375/346

See application file for complete search history.

(56) References Cited

U.S. PATENT DOCUMENTS

| | | | | |
|---|---|---|---|---|
| 5,493,581 A * | 2/1996 | Young et al. | ................ | 375/350 |
| 5,774,561 A * | 6/1998 | Nakagawa et al. | ............ | 381/66 |
| 5,884,194 A * | 3/1999 | Shiraki | ................... | 455/570 |
| 5,892,757 A * | 4/1999 | Norrell et al. | ................ | 370/292 |
| 6,215,828 B1 | 4/2001 | Signell et al. | | |
| 6,512,472 B1 | 1/2003 | Smith et al. | | |
| 6,667,923 B1 | 12/2003 | DelMain et al. | | |
| 7,477,682 B2 * | 1/2009 | LeBlanc | ................... | 375/222 |
| 2001/0044722 A1 | 11/2001 | Gustafsson et al. | | |

FOREIGN PATENT DOCUMENTS

WO    WO0161687    8/2001

* cited by examiner

*Primary Examiner* — Emmanuel Bayard
(74) *Attorney, Agent, or Firm* — Thomas Horstemeyer, LLP

(57) ABSTRACT

An apparatus and methods supporting improved echo cancellation in a packet network is disclosed. An embodiment of the present invention may permit a split-band communication system operating in a narrowband mode to provide improved suppression of hybrid echo generated by the conversion of signals from a packet network to a two-wire analog circuit. By detecting the presence of signal characteristics outside of the relatively narrower bandwidth to be communicated, such an embodiment may more accurately detect the occurrence of speech received from a party on a relatively wider bandwidth communication circuit. The accurate detection of speech permits more effective suppression of any hybrid echo remaining after echo cancellation. An embodiment of the present invention may also have application in other systems that detect signals received via a path having a bandwidth greater than that to be transmitted.

23 Claims, 10 Drawing Sheets

ECHO CANCELLATION FOR A PACKET VOICE SYSTEM

RELATED APPLICATIONS

This application is a continuation of U.S. patent application Ser. No. 10/736,349, filed Dec. 15, 2003, now U.S. Pat. No. 7,477,682, which is a continuation in part of U.S. patent application Ser. No. 10/313,367 entitled "Multiple Data Rate Communication System", filed Dec. 6, 2002, now U.S. Pat. No. 7,283,585 which claims the benefit of the following United States Provisional Patent applications, the complete subject matter of each of which is hereby incorporated herein by reference, in its entirety: With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

| Serial No. | Title | Filed | Inventors |
| --- | --- | --- | --- |
| 60/414,059 | Multiple Data Rate Communication System | Sep. 27, 2002 | LeBlanc Houghton Cheung |
| 60/414,460 | Dual-Rate Single Band Communication System | Sep. 27, 2002 | LeBlanc Houghton Cheung |
| 60/414,492 | Method and System for an Adaptive Multimode Media Queue | Sep. 27, 2002 | LeBlanc Houghton Cheung |
| 60/414,491 | Splitter and Combiner for Multiple Data Rate Communication System | Sep. 27, 2002 | LeBlanc Houghton Cheung |
| 60/414,493 | Switchboard for Multiple Data Rate Communication System | Sep. 27, 2002 | LeBlanc Houghton Cheung |

In addition, the complete subject matter of each of the following United States Patent Applications is hereby incorporated herein by reference, in its entirety:

| Serial No. | Title | Filed | Inventors |
| --- | --- | --- | --- |
| 10/320,204 | Dual-Rate Single Band Communication System | Dec. 16, 2002 | LeBlanc Houghton Cheung |
| 10/313,826 | Method and System for an Adaptive Multimode Media Queue | Dec. 6, 2002 | LeBlanc Houghton Cheung |
| 10/313,697 | Splitter and Combiner for Multiple Data Rate Communication System | Dec. 6, 2002 | LeBlanc Houghton Cheung |
| 10/313,672 | Switchboard for Multiple Data Rate Communication System | Dec. 6, 2002 | LeBlanc Houghton Cheung |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Traditional voice telephony products are band-limited to 4 kHz bandwidth with 8 kHz sampling, known as "narrowband". These products include the telephone, data modems, and fax machines. Newer products aiming to achieve higher voice quality have doubled the sampling rate to 16 kHz to encompass a larger 8 kHz bandwidth, which is also known as "wideband" capable. The software implications of doubling the sampling rate are significant. Doubling the sampling rate not only requires doubling the processing cycles, but nearly doubling the memory used to store the data.

Doubling memory and processor cycles requirements is expensive because the memory and processing power footprints of DSPs are generally small. Implementing wideband support thus requires creativeness to optimize both memory and cycles.

Additionally, much of the software providing various functions and services, such as echo cancellation, dual-tone multifrequency (DTMF) detection and generation, and call discrimination (between voice and facsimile transmission, for example), are written for only narrowband signals. Either software must be written for wideband signals, or the wideband signal down-sampled. Where the software is modified, the software should also be capable of integration with pre-existing narrowband devices. Providing software for operation with both narrowband and wideband devices is complex and costly.

A scheme for down-sampling the wideband signal is presented in the co-pending application "Dual-Rate Single Band Communication System".

Further limitations and disadvantages of conventional and traditional approaches will become apparent to one of skill in the art, through comparison of such systems with aspects of the present invention as set forth in the remainder of the present application with reference to the drawings.

BRIEF SUMMARY OF THE INVENTION

Aspects of the present invention may be found in a method of operating a communication system. Such a method may comprise receiving a first signal having spectral components within a first frequency band, accepting a second signal having spectral components in at least a second frequency band, removing a modified version of the first signal from the second signal to produce a third signal, and processing the third signal based upon a level of spectral components of the second signal in the second frequency band. The first frequency band may comprise from approximately 0 Hz to approximately 4 KHz, and the second frequency band may comprise from approximately 4 KHz to approximately 8 KHz. In an embodiment of the present invention, the first frequency band and the second frequency band may be essentially non-overlapping. The modification of the first signal may comprise at least one of delaying and attenuating, and the processing may comprise attenuating the third signal when the level of spectral components of the second signal in the second frequency band is below a predetermined level and refraining from attenuating the third signal when the level of spectral components of the second signal in the second frequency band is at or above the predetermined level. The communication system may comprise a packet network.

Additional aspects of the present invention may be seen in a method of operating a communication system. An embodiment of such a method may comprise receiving a first signal having a relatively greater bandwidth, and processing the first signal to produce a second signal having a relatively lesser bandwidth. The communication system may detect the occurrence of the first signal based upon at least one characteristic of the first signal that is not present in the second signal. The at least one characteristic may comprise the presence of energy in a portion of the relatively greater bandwidth of the first signal, the portion not being present in the relatively lesser bandwidth of the second signal.

Further aspects of the present invention may be observed in a machine-readable storage. The machine readable storage may have stored thereon a computer program having a plurality of code sections for operating a communication system. The code sections may be executable by a machine for causing the machine to perform the operations comprising receiving a first signal having spectral components within a first frequency band, and accepting a second signal having spectral components in a second frequency band. The operations may also comprise removing a modified version of the first signal from the second signal to produce a third signal, and processing the third signal based upon a level of spectral components of the second signal in the second frequency band. In an embodiment of the present invention, the first frequency band may comprise approximately 0 Hz to approximately 4 KHz, and the second frequency band may comprise approximately 4 KHz to approximately 8 KHz. The first frequency band and the second frequency band may be essentially non-overlapping. The modification of the first signal may comprise at least one of delaying and attenuating. The processing may comprise attenuating the third signal when the level of spectral components of the second signal in the second frequency band is below a predetermined level, and refraining from attenuating the third signal when the level of spectral components of the second signal in the second frequency band is at or above the predetermined level. In an embodiment of the present invention, the communication system may comprise a packet network.

Yet other aspects of the present invention may be seen in a signal processing device comprising a first input for receiving a first signal comprising energy in a first frequency band, a second input for receiving a second signal comprising energy in a second frequency band, and an echo canceller that receives the first signal and the second signal. The echo canceller may produce a third signal. An embodiment of the present invention may also comprise a non-linear processor that attenuates the third signal based upon a level of energy in the second frequency band of the second input. The first frequency band may comprise from approximately 0 Hz to approximately 4 KHz, and the second frequency band may comprise from approximately 4 KHz to approximately 8 KHz. In an embodiment of the present invention, the first frequency band and the second frequency band may be essentially non-overlapping. The communication system may comprise a packet network.

These and other advantages, aspects, and novel features of the present invention, as well as details of illustrated embodiments, thereof, will be more fully understood from the following description and drawings.

DETAILED DESCRIPTION OF THE INVENTION

Figure 1A:
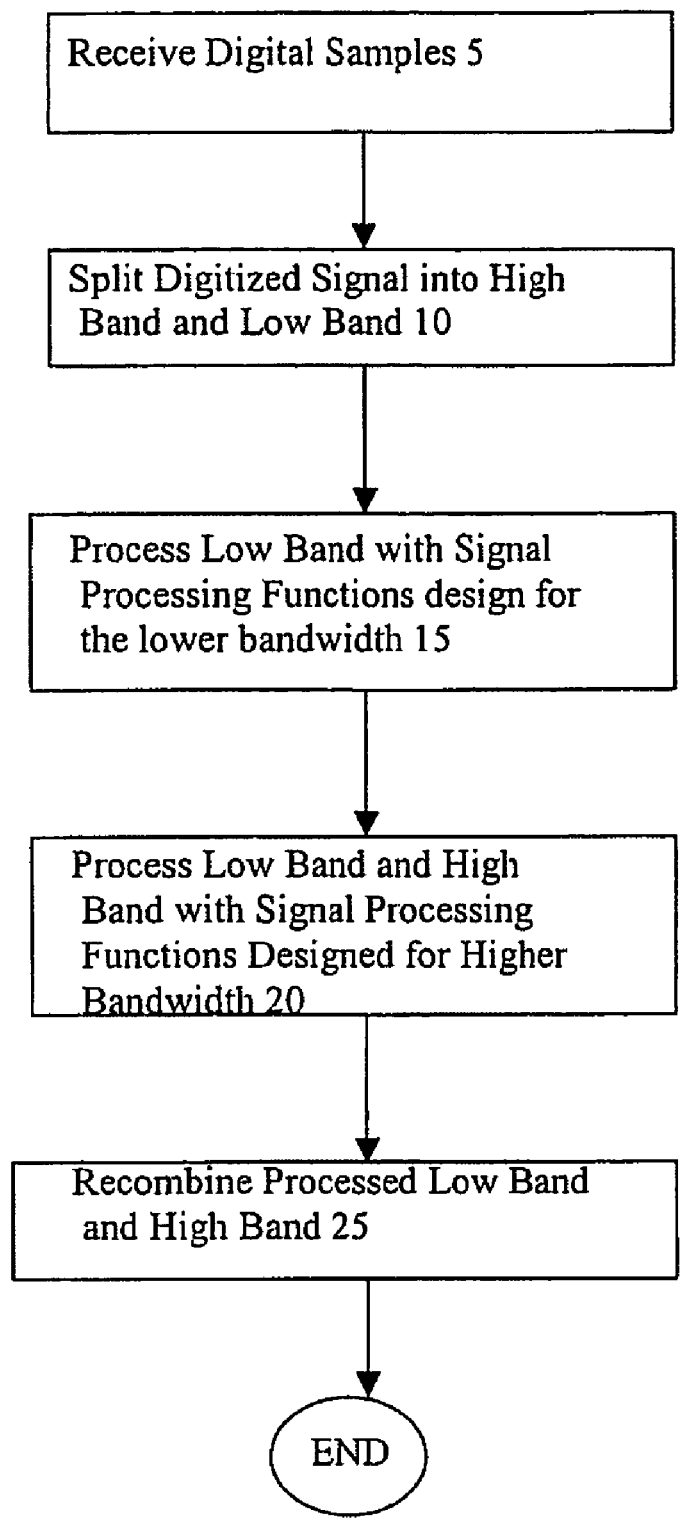
FIG. 1A is a flow diagram describing the provisioning of software functions designed for a smaller band of signals to a broader band of signals.
Figure 1B:
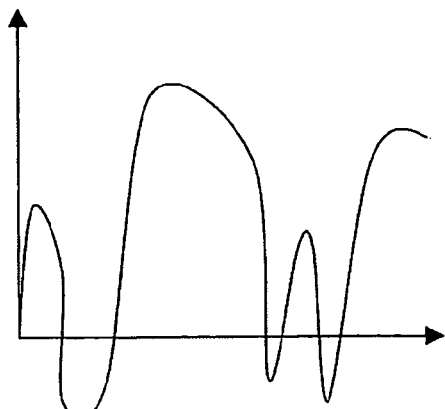
FIG. 1B is a block diagram of an exemplary signal.
Figure 1C:
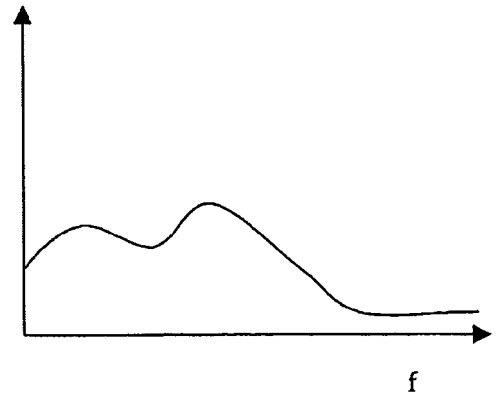
FIG. 1C is a graph representing frequency components of a signal.
Figure 1D:
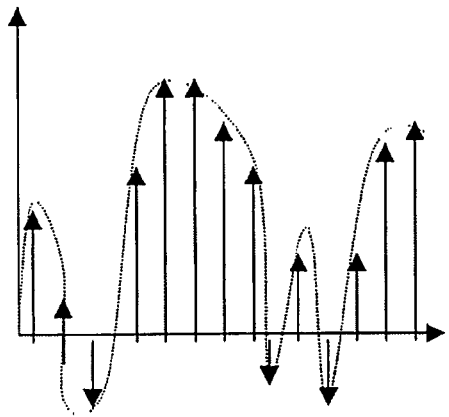
FIG. 1D is a graph representing the digitization of the signal at X samples/second.
Figure 1E:
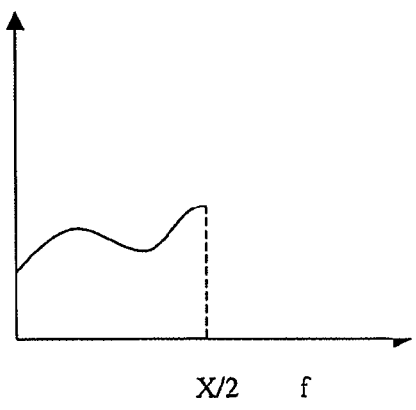
FIG. 1E is a graph representing the frequency components of a digitized signal at X samples/second.

Referring now to FIG. 1A, there is illustrated a flow diagram describing the provisioning of signal processing functions designed for digital samples of signals sampled at a particular rate to digital samples of a signal sampled at a higher rate. The flow diagram will be described in conjunction with FIGS. 1B-1G. The functions can comprise, for example, software functions. At 5, digital samples representing a signal are received. FIG. 1B is a graph of an exemplary signal. Those skilled in the art will recognize that a signal can be represented by a series of frequency components. FIG. 1C is an exemplary graph representing the magnitude of frequency components as a function of frequencies. Digitizing the input signal generates digital samples. FIG. 1D is a graph representing the digitization of the signal in FIG. 1B at X samples/sec. As can be seen, the digitized representation of the signal loses some of the information in the original signal. The amount of information lost is dependent on the sampling rate. Those skilled in the art will recognize that the information lost during the digitization comprises the frequency components exceeding one-half the sampling rate. For example, an input signal sampled at 16,000 samples/sec. loses the information in the frequency components exceeding 8 KHz. FIG. 1E is an exemplary block diagram of frequency components for a signal digitized at X samples/sec.

The digital samples received at 5 represent an input signal that is sampled at a higher sampling rate and representing a higher bandwidth, than the sampling rate and bandwidth for which the signal processing functions are designed. For example, a software function may be designed to process a signal sampled at X samples/sec. (X/2 bandwidth), while the input signal is sampled at 2X samples/sec (X bandwidth).

In order to provide an appropriate input signal to the software functions, the digitized input signal is split (10) into a low band and a high band. The low band is the digitized samples of the signal resulting from the frequency components that are less than a predetermined frequency, wherein the frequency is less than or equal to the highest frequency in the band for which the processing function was designed. The high band is the resulting digitized signal from the frequency components greater than the predetermined frequency.

Figure 1F:
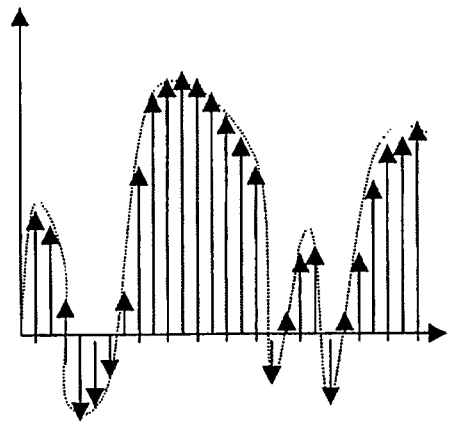
FIG. 1F is a graph representing the digitization of a signal at 2X samples/second.
Figure 1G:
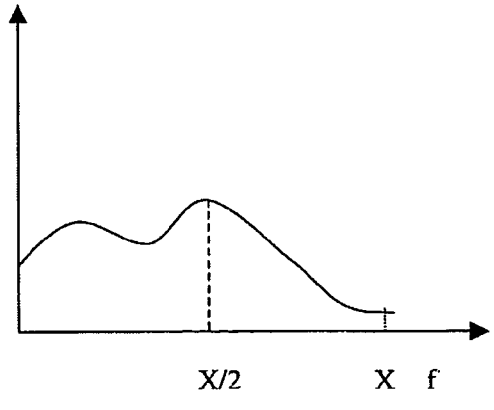
FIG. 1G is a graph representing the frequency components of a digitized signal at 2X samples/second.

For example, signal processing functions designed for signals sampled at X samples/sec. can be provided to a input signal sampled at 2X samples/sec. by splitting the input signal into a low band comprising the digitized signal resulting from frequency components between 0 and X/2, and a high band comprising the digitized signal resulting from the frequency components between X/2 and X. FIG. 1F is a digitized representation of a signal at 2X samples/sec. FIG. 1G is an exemplary graph of the magnitude of frequency components of a signal digitized at 2X samples/sec. The low band is a signal resulting from the frequency components 0 to X/2 and the high band is a signal resulting from the frequency components X/2 to X.

The frequency components 0 to X/2 can be digitized by X samples/sec. Thus the signal processing function can be provided to the low band signal. At 15, the signal processing functions designed for the lower bandwidth process the low band signal. Signal processing functions that are designed for the larger bandwidth process both the low band signal and the high band signal (20).

At 25, the low band signal and high band signal are recombined. The combined signal can be further processed or output. For example, recombined signal can be packetized and provided to a transceiver for transmission over a network. Alternatively, the recombined signal can be provided to an output device, such as a speaker.

As can be seen, the foregoing provides a scheme wherein processing functions designed to operate on a signal with a particular sampling rate can be provided to a signal sampled at a higher rate. In one embodiment of the present invention, the foregoing scheme can be utilized to provide the functionality of software designed for an audio signal represented by digital samples within a particular bandwidth, to an audio signal represented by digital samples within a higher bandwidth.

The human ear can hear audio frequencies within approximately 0-4 KHz, with greater audibility at the lower frequencies and lesser audibility at the higher frequencies. Therefore, the portion of an audio signal that is detectable by the human ear can be represented by 8000 samples/sec. Accordingly, many software programs providing signal processing for audio signals, known as services, were designed for an input signal represented by 8000 samples/sec. and a 0-4 KHz bandwidth. For example, the public switched telephone network in the United States uses 8000 8-bit samples per second to represent a voice signal. The foregoing is known as narrowband sampling. However, significant improvements in quality have been observed when audible sound is sampled at a 16 KHz (16,000 samples/sec) representing the 0-8 KHz bandwidth. The foregoing is referred to as wideband sampling.

Many voice communication networks, such as voice over packet networks support wideband sampled speech. Additionally, the voice over packet networks support narrowband sampled speech. Narrowband sampled speech is supported to interface with the public switched telephone network as well as to allow for use of preexisting terminals which sample speech at the narrowband rate. The foregoing invention can be utilized to provide functionality of services designed for narrowband sampled signals to wideband sampled signals.

Figure 2:
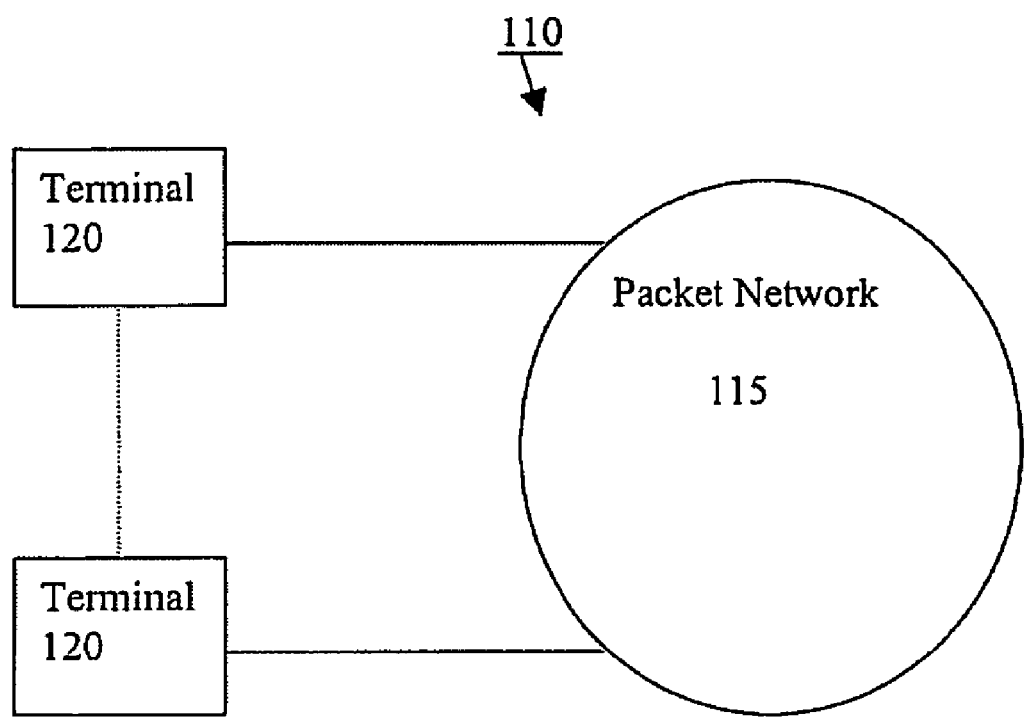
FIG. 2 is a block diagram of an exemplary communication system wherein the present invention can be practiced.

Referring now to FIG. 2, there is illustrated a block diagram of an exemplary voice-over-packet (VOP) network 110, wherein the present invention can be practiced. The VOP network 110 comprises a packet network 115 and a plurality of terminals 120. The terminals 120 are capable of receiving user input. The user input can comprise, for example, the user's voice, video, or a document for facsimile transmission. The VOP network 110 supports various communication sessions between terminals 120 which simulate voice calls and/or facsimile transmissions over a switched telephone network.

The terminals 120 are equipped to convert the user input into an electronic signal, digitize the electronic signal, and packetize the digital samples. The sampling rate for digitizing the electronic signal can be either 8 Khz (narrowband) sampling, or 16 KHz (wideband) sampling. Accordingly, narrowband sampling is bandwidth limited to 4 KHz while wideband sampling is bandwidth limited to 8 KHz.

The VOP network 110 provides various functions and services, including DTMF generation and detection, and call discrimination between voice and facsimile, by means of a Virtual Hausware Device (VHD) and a Physical Device Driver (PXD). The foregoing services are implemented by software modules and utilize narrowband digitized samples for inputs. For terminals 120 with narrowband sampling, the digitized samples are provided directly to the software modules. For terminals 120 with wideband sampling, the 8 KHz bandwidth is split into a high band and a G.712 compliant low band. The software modules requiring narrowband digitized samples operate on the low band, while software modules requiring wideband digitized samples operate on both the high band and the low band.

The split-band approach enables straightforward support for narrow and wide band services because narrowband services are incognizant of the wideband support. Narrowband services only require and operate on an 8 kHz-sampled stream of data (i.e. the low band). Generally, only wideband services understand and operate on both bands.

Figure 3:
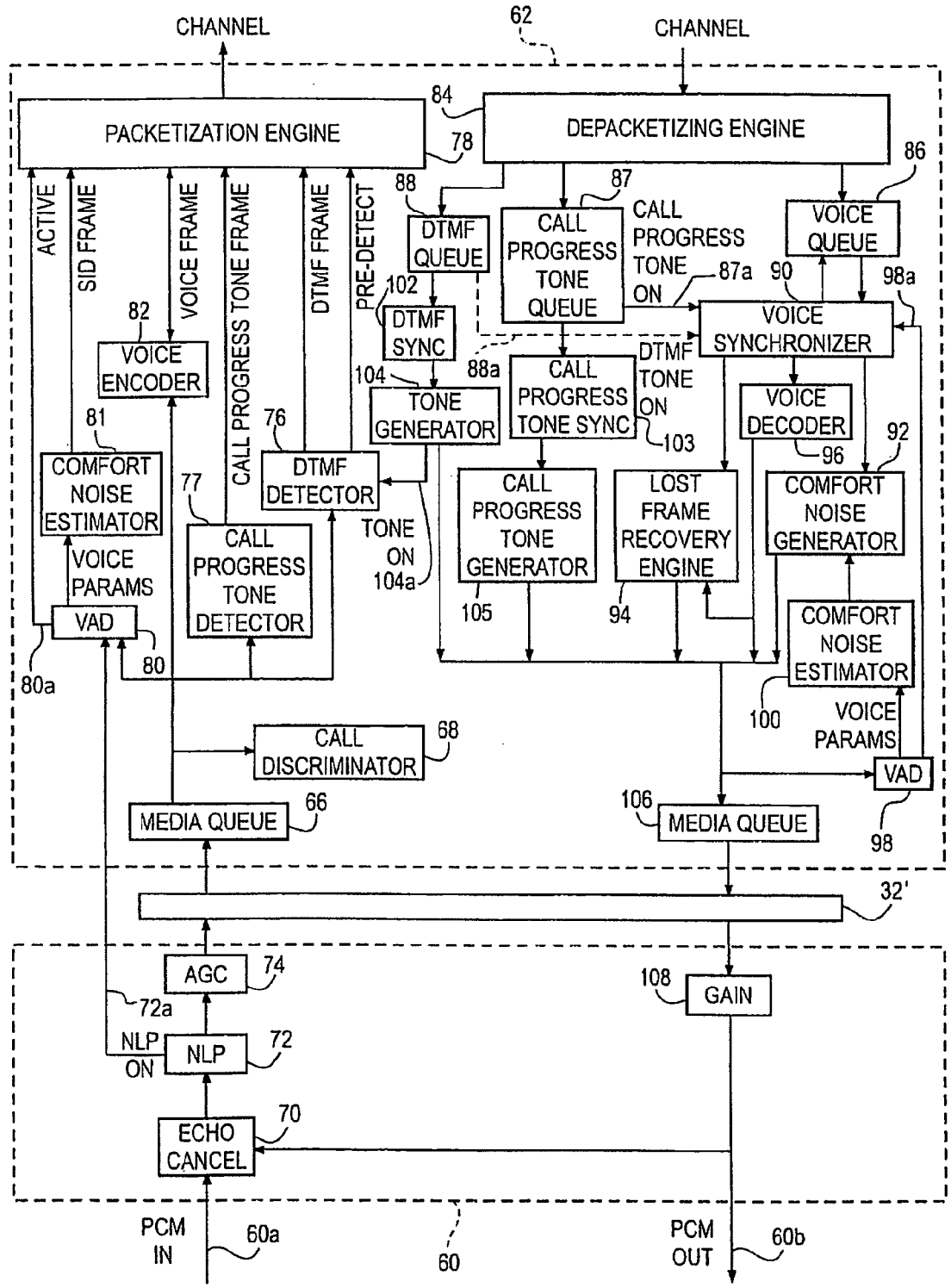
FIG. 3 is a block diagram of a signal processing system operating in a voice mode in accordance with a preferred embodiment of the present invention.

The services invoked by the network VHD in the voice mode and the associated PXD is shown schematically in FIG. 3. In the described exemplary embodiment, the PXD 60 provides two way communication with a telephone or a circuit-switched network, such as a PSTN line (e.g. DS0) carrying a 64 kb/s pulse code modulated (PCM) signal, i.e., digital voice samples.

The incoming PCM signal 60a is initially processed by the PXD 60 to remove far end echoes that might otherwise be transmitted back to the far end user. As the name implies, echoes in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 70 is used to remove echoes from far end speech present on the incoming PCM signal 60a before routing the incoming PCM signal 60a back to the far end user. The echo canceller 70 samples an outgoing PCM signal 60b from the far end user, filters it, and combines it with the incoming PCM signal 60a. Preferably, the echo canceller 70 is followed by a non-linear processor (NLP) 72 which may mute the digital voice samples when far end speech is detected in the absence of near end speech. The echo canceller 70 may also inject comfort noise which in the absence of near end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60*b*. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice engine, and packet tone exchange. The call discriminator 68 analyzes the digital voice samples from the media queue to determine whether a 2100 Hz tone, a 1100 Hz tone or V.21 modulated HDLC flags are present. In the absence of a 2100 Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice engine, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should be disabled when the NLP 72 is activated. This is accomplished by a "NLP on" message 72*a* passed from the NLP 72 to the VAD 80.

The voice encoder 82, operating under the packet voice engine, can be a straight 16 bit PCM encoder or any voice encoder which supports one or more of the standards promulgated by ITU. The encoded digital voice samples are formatted into a voice packet (or packets) by the packetization engine 78. These voice packets are formatted according to an applications protocol and outputted to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80*a* to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 76 determines whether or not there is a DTMF signal present at the near end. The DTMF detector 76 also provides a pre-detection flag 76*a* which indicates whether or not it is likely that the digital voice sample might be a portion of a DTMF signal. If so, the pre-detection flag 76*a* is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76*a* is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a depacketizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The depacketizing engine 84 identifies the type of packets received from the host (i.e., voice packet, DTMF packet, call progress tone packet, SID packet), transforms them into frames which are protocol independent. The depacketizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving with the same relative timing in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near end user during silent periods. If the protocol supports SID packets, (and these are supported for VTOA, FRF-11, and VOIP), the comfort noise estimator at the far end encoding system should transmit SID packets. Then, the background noise can be reconstructed by the near end comfort noise generator 92 from the voice parameters in the SID packets buffered in the voice queue 86. However, for some protocols, namely, FRF-11, the SID packets are optional, and other far end users may not support SID packets at all. In these systems, the voice synchronizer 90 must continue to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98*a* fed back to the voice synchronizer 90. The voice synchronizer 90 can then invoke the lost packet recovery engine 94 during voice packet losses and the comfort noise generator 92 during silent periods.

When DTMF packets arrive, they are depacketized by the depacketizing engine 84. DTMF frames at the output of the depacketizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant gap before DTMF tones are generated. This is achieved by a "tone present" message 88*a* passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104*a* passed between the tone generator 104 and the DTMF detector 76. Alternatively, the NLP 72 can be activated while generating DTMF tones.

When call progress tone packets arrive, they are depacketized by the depacketizing engine 84. Call progress tone frames at the output of the depacketizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87*a* passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60*b*.

The outgoing PCM signal in the media queue 106 is coupled to the PXD 60 via the switchboard 32'. The outgoing PCM signal is coupled to an amplifier 108 before being outputted on the PCM output line 60*b*.

1. Voice Encoder/Voice Decoder

The purpose of voice compression algorithms is to represent voice with highest efficiency (i.e., highest quality of the reconstructed signal using the least number of bits). Efficient voice compression was made possible by research starting in the 1930's that demonstrated that voice could be characterized by a set of slowly varying parameters that could later be used to reconstruct an approximately matching voice signal.

Characteristics of voice perception allow for lossy compression without perceptible loss of quality.

Voice compression begins with an analog-to-digital converter that samples the analog voice at an appropriate rate (usually 8,000 samples per second for telephone bandwidth voice) and then represents the amplitude of each sample as a binary code that is transmitted in a serial fashion. In communications systems, this coding scheme is called pulse code modulation (PCM).

When using a uniform (linear) quantizer in which there is uniform separation between amplitude levels. This voice compression algorithm is referred to as "linear," or "linear PCM." Linear PCM is the simplest and most natural method of quantization. The drawback is that the signal-to-noise ratio (SNR) varies with the amplitude of the voice sample. This can be substantially avoided by using non-uniform quantization known as companded PCM.

In companded PCM, the voice sample is compressed to logarithmic scale before transmission, and expanded upon reception. This conversion to logarithmic scale ensures that low-amplitude voice signals are quantized with a minimum loss of fidelity, and the SNR is more uniform across all amplitudes of the voice sample. The process of compressing and expanding the signal is known as "companding" (COMpressing and exPANDing). There exists a worldwide standard for companded PCM defined by the CCITT (the International Telegraph and Telephone Consultative Committee).

The CCITT is a Geneva-based division of the International Telecommunications Union (ITU), a New York-based United Nations organization. The CCITT is now formally known as the ITU-T, the telecommunications sector of the ITU, but the term CCITT is still widely used. Among the tasks of the CCITT is the study of technical and operating issues and releasing recommendations on them with a view to standardizing telecommunications on a worldwide basis. A subset of these standards is the G-Series Recommendations, which deal with the subject of transmission systems and media, and digital systems and networks. Since 1972, there have been a number of G-Series Recommendations on speech coding, the earliest being Recommendation G.711. G.711 has the best voice quality of the compression algorithms but the highest bit rate requirement.

The ITU-T defined the "first" voice compression algorithm for digital telephony in 1972. It is companded PCM defined in Recommendation G.711. This Recommendation constitutes the principal reference as far as transmission systems are concerned. The basic principle of the G.711 companded PCM algorithm is to compress voice using 8 bits per sample, the voice being sampled at 8 kHz, keeping the telephony bandwidth of 300-3400 Hz. With this combination, each voice channel requires 64 kilobits per second.

Note that when the term PCM is used in digital telephony, it usually refers to the companded PCM specified in Recommendation G.711, and not linear PCM, since most transmission systems transfer data in the companded PCM format. Companded PCM is currently the most common digitization scheme used in telephone networks. Today, nearly every telephone call in North America is encoded at some point along the way using G.711 companded PCM.

ITU Recommendation G.726 specifies a multiple-rate ADPCM compression technique for converting 64 kilobit per second companded PCM channels (specified by Recommendation G.711) to and from a 40, 32, 24, or 16 kilobit per second channel. The bit rates of 40, 32, 24, and 16 kilobits per second correspond to 5, 4, 3, and 2 bits per voice sample.

ADPCM is a combination of two methods: Adaptive Pulse Code Modulation (APCM), and Differential Pulse Code Modulation (DPCM). Adaptive Pulse Code Modulation can be used in both uniform and non-uniform quantizer systems. It adjusts the step size of the quantizer as the voice samples change, so that variations in amplitude of the voice samples, as well as transitions between voiced and unvoiced segments, can be accommodated. In DPCM systems, the main idea is to quantize the difference between contiguous voice samples. The difference is calculated by subtracting the current voice sample from a signal estimate predicted from previous voice sample. This involves maintaining an adaptive predictor (which is linear, since it only uses first-order functions of past values). The variance of the difference signal results in more efficient quantization (the signal can be compressed coded with fewer bits).

The G.726 algorithm reduces the bit rate required to transmit intelligible voice, allowing for more channels. The bit rates of 40, 32, 24, and 16 kilobits per second correspond to compression ratios of 1.6:1, 2:1, 2.67:1, and 4:1 with respect to 64 kilobits per second companded PCM. Both G.711 and G.726 are waveform encoders; they can be used to reduce the bit rate require to transfer any waveform, like voice, and low bit-rate modem signals, while maintaining an acceptable level of quality.

There exists another class of voice encoders, which model the excitation of the vocal tract to reconstruct a waveform that appears very similar when heard by the human ear, although it may be quite different from the original voice signal. These voice encoders, called vocoders, offer greater voice compression while maintaining good voice quality, at the penalty of higher computational complexity and increased delay.

For the reduction in bit rate over G.711, one pays for an increase in computational complexity. Among voice encoders, the G.726 ADPCM algorithm ranks low to medium on a relative scale of complexity, with companded PCM being of the lowest complexity and code-excited linear prediction (CELP) vocoder algorithms being of the highest.

The G.726 ADPCM algorithm is a sample-based encoder like the G.711 algorithm, therefore, the algorithmic delay is limited to one sample interval. The CELP algorithms operate on blocks of samples (0.625 ms to 30 ms for the ITU coder), so the delay they incur is much greater.

The quality of G.726 is best for the two highest bit rates, although it is not as good as that achieved using companded PCM. The quality at 16 kilobits per second is quite poor (a noticeable amount of noise is introduced), and should normally be used only for short periods when it is necessary to conserve network bandwidth (overload situations).

The G.726 interface specifies as input to the G.726 encoder (and output to the G.726 decoder) an 8-bit companded PCM sample according to Recommendation G.711. So strictly speaking, the G.726 algorithm is a transcoder, taking log-PCM and converting it to ADPCM, and vice-versa. Upon input of a companded PCM sample, the G.726 encoder converts it to a 14-bit linear PCM representation for intermediate processing. Similarly, the decoder converts an intermediate 14-bit linear PCM value into an 8-bit companded PCM sample before it is output. An extension of the G.726 algorithm was carried out in 1994 to include, as an option, 14-bit linear PCM input signals and output signals. The specification for such a linear interface is given in Annex A of Recommendation G.726.

The interface specified by G.726 Annex A bypasses the input and output companded PCM conversions. The effect of removing the companded PCM encoding and decoding is to decrease the coding degradation introduced by the compression and expansion of the linear PCM samples.

The algorithm implemented in the described exemplary embodiment can be the version specified in G.726 Annex A, commonly referred to as G.726A, or any other voice compression algorithm known in the art. Among these voice compression algorithms are those standardized for telephony by the ITU-T. Several of these algorithms operate at a sampling rate of 8000 Hz. with different bit rates for transmitting the encoded voice. By way of example, Recommendations G.729 (1996) and G.723.1 (1996) define code excited linear prediction (CELP) algorithms that provide even lower bit rates than G.711 and G.726. G.729 operates at 8 kbps and G.723.1 operates at either 5.3 kbps or 6.3 kbps.

In an exemplary embodiment, the voice encoder and the voice decoder support one or more voice compression algorithms, including but not limited to, 16 bit PCM (non-standard, and only used for diagnostic purposes); ITU-T standard G.711 at 64 kb/s; G.723.1 at 5.3 kb/s (ACELP) and 6.3 kb/s (MP-MLQ); ITU-T standard G.726 (ADPCM) at 16, 24, 32, and 40 kb/s; ITU-T standard G.727 (Embedded ADPCM) at 16, 24, 32, and 40 kb/s; ITU-T standard G.728 (LD-CELP) at 16 kb/s; and ITU-T standard G.729 Annex A (CS-ACELP) at 8 kb/s.

The packetization interval for 16 bit PCM, G.711, G.726, G.727 and G.728 should be a multiple of 5 msec in accordance with industry standards. The packetization interval is the time duration of the digital voice samples that are encapsulated into a single voice packet. The voice encoder (decoder) interval is the time duration in which the voice encoder (decoder) is enabled. The packetization interval should be an integer multiple of the voice encoder (decoder) interval (a frame of digital voice samples). By way of example, G.729 encodes frames containing 80 digital voice samples at 8 kHz which is equivalent to a voice encoder (decoder) interval of 10 msec. If two subsequent encoded frames of digital voice sample are collected and transmitted in a single packet, the packetization interval in this case would be 20 msec.

G.711, G.726, and G.727 encodes digital voice samples on a sample by sample basis. Hence, the minimum voice encoder (decoder) interval is 0.125 msec. This is somewhat of a short voice encoder (decoder) interval, especially if the packetization interval is a multiple of 5 msec. Therefore, a single voice packet will contain 40 frames of digital voice samples. G.728 encodes frames containing 5 digital voice samples (or 0.625 msec). A packetization interval of 5 msec (40 samples) can be supported by 8 frames of digital voice samples. G.723.1 compresses frames containing 240 digital voice samples. The voice encoder (decoder) interval is 30 msec, and the packetization interval should be a multiple of 30 msec.

Packetization intervals which are not multiples of the voice encoder (or decoder) interval can be supported by a change to the packetization engine or the depacketization engine. This may be acceptable for a voice encoder (or decoder) such as G.711 or 16 bit PCM.

The G.728 standard may be desirable for some applications. G.728 is used fairly extensively in proprietary voice conferencing situations and it is a good trade-off between bandwidth and quality at a rate of 16 kb/s. Its quality is superior to that of G.729 under many conditions, and it has a much lower rate than G.726 or G.727. However, G.728 is MIPS intensive.

Differentiation of various voice encoders (or decoders) may come at a reduced complexity. By way of example, both G.723.1 and G.729 could be modified to reduce complexity, enhance performance, or reduce possible IPR conflicts. Performance may be enhanced by using the voice encoder (or decoder) as an embedded coder. For example, the "core" voice encoder (or decoder) could be G.723.1 operating at 5.3 kb/s with "enhancement" information added to improve the voice quality. The enhancement information may be discarded at the source or at any point in the network, with the quality reverting to that of the "core" voice encoder (or decoder). Embedded coders may be readily implemented since they are based on a given core. Embedded coders are rate scalable, and are well suited for packet based networks. If a higher quality 16 kb/s voice encoder (or decoder) is required, one could use G.723.1 or G.729 Annex A at the core, with an extension to scale the rate up to 16 kb/s (or whatever rate was desired).

The configurable parameters for each voice encoder or decoder include the rate at which it operates (if applicable), which companding scheme to use, the packetization interval, and the core rate if the voice encoder (or decoder) is an embedded coder. For G.727, the configuration is in terms of bits/sample. For example EADPCM(5,2) (Embedded ADPCM, G.727) has a bit rate of 40 kb/s (5 bits/sample) with the core information having a rate of 16 kb/s (2 bits/sample).

2. Packetization Engine

In an exemplary embodiment, the packetization engine groups voice frames from the voice encoder, and with information from the VAD, creates voice packets in a format appropriate for the packet based network. The two primary voice packet formats are generic voice packets and SID packets. The format of each voice packet is a function of the voice encoder used, the selected packetization interval, and the protocol.

Those skilled in the art will readily recognize that the packetization engine could be implemented in the host. However, this may unnecessarily burden the host with configuration and protocol details, and therefore, if a complete self contained signal processing system is desired, then the packetization engine should be operated in the network VHD. Furthermore, there is significant interaction between the voice encoder, the VAD, and the packetization engine, which further promotes the desirability of operating the packetization engine in the network VHD.

The packetization engine may generate the entire voice packet or just the voice portion of the voice packet. In particular, a fully packetized system with all the protocol headers may be implemented, or alternatively, only the voice portion of the packet will be delivered to the host. By way of example, for VoIP, it is reasonable to create the real-time transport protocol (RTP) encapsulated packet with the packetization engine, but have the remaining transmission control protocol/Internet protocol (TCP/IP) stack residing in the host. In the described exemplary embodiment, the voice packetization functions reside in the packetization engine. The voice packet should be formatted according to the particular standard, although not all headers or all components of the header need to be constructed.

3. Voice Depacketizing Engine/Voice Queue

In an exemplary embodiment, voice de-packetization and queuing is a real time task which queues the voice packets with a time stamp indicating the arrival time. The voice queue should accurately identify packet arrival time within one msec resolution. Resolution should preferably not be less than the encoding interval of the far end voice encoder. The depacketizing engine should have the capability to process voice packets that arrive out of order, and to dynamically switch between voice encoding methods (i.e. between, for example, G.723.1 and G.711). Voice packets should be queued such that it is easy to identify the voice frame to be released, and easy to determine when voice packets have been lost or discarded en route.

The voice queue may require significant memory to queue the voice packets. By way of example, if G.711 is used, and the worst-case delay variation is 250 msec, the voice queue should be capable of storing up to 500 msec of voice frames. At a data rate of 64 kb/s this translates into 4000 bytes or, or 2K (16 bit) words of storage. Similarly, for 16 bit PCM, 500 msec of voice frames require 4K words. Limiting the amount of memory required may limit the worst case delay variation of 16 bit PCM and possibly G.711. This, however, depends on how the voice frames are queued, and whether dynamic memory allocation is used to allocate the memory for the voice frames. Thus, it is preferable to optimize the memory allocation of the voice queue.

The voice queue transforms the voice packets into frames of digital voice samples. If the voice packets are at the fundamental encoding interval of the voice frames, then the delay jitter problem is simplified. In an exemplary embodiment, a double voice queue is used. The double voice queue includes a secondary queue which time stamps and temporarily holds the voice packets, and a primary queue which holds the voice packets, time stamps, and sequence numbers. The voice packets in the secondary queue are disassembled before transmission to the primary queue. The secondary queue stores packets in a format specific to the particular protocol, whereas the primary queue stores the packets in a format which is largely independent of the particular protocol.

In practice, it is often the case that sequence numbers are included with the voice packets, but not the SID packets, or a sequence number on a SID packet is identical to the sequence number of a previously received voice packet. Similarly, SID packets may or may not contain useful information. For these reasons, it may be useful to have a separate queue for received SID packets.

The depacketizing engine is preferably configured to support VoIP, VTOA, VoFR and other proprietary protocols. The voice queue should be memory efficient, while providing the ability to handle dynamically switched voice encoders (at the far end), allow efficient reordering of voice packets (used for VOIP) and properly identify lost packets.

4. Voice Synchronization

In an exemplary embodiment, the voice synchronizer analyzes the contents of the voice queue and determines when to release voice frames to the voice decoder, when to play comfort noise, when to perform frame repeats (to cope with lost voice packets or to extend the depth of the voice queue), and when to perform frame deletes (in order to decrease the size of the voice queue). The voice synchronizer manages the asynchronous arrival of voice packets. For those embodiments that are not memory limited, a voice queue with sufficient fixed memory to store the largest possible delay variation is used to process voice packets which arrive asynchronously. Such an embodiment includes sequence numbers to identify the relative timings of the voice packets. The voice synchronizer should ensure that the voice frames from the voice queue can be reconstructed into high quality voice, while minimizing the end-to-end delay. These are competing objectives so the voice synchronizer should be configured to provide system trade-off between voice quality and delay.

Preferably, the voice synchronizer is adaptive rather than fixed based upon the worst-case delay variation. This is especially true in cases such as VoIP where the worst-case delay variation can be on the order of a few seconds. By way of example, consider a VoIP system with a fixed voice synchronizer based on a worst-case delay variation of 300 msec. If the actual delay variation is 280 msec, the signal processing system operates as expected. However, if the actual delay variation is 20 msec, then the end-to-end delay is at least 280 msec greater than required. In this case the voice quality should be acceptable, but the delay would be undesirable. On the other hand, if the delay variation is 330 msec then an underflow condition could exist degrading the voice quality of the signal processing system.

The voice synchronizer performs four primary tasks. First, the voice synchronizer determines when to release the first voice frame of a talk spurt from the far end. Subsequent to the release of the first voice frame, the remaining voice frames are released in an isochronous manner. In an exemplary embodiment, the first voice frame is held for a period of time that is equal or less than the estimated worst-case jitter.

Second, the voice synchronizer estimates how long the first voice frame of the talk spurt should be held. If the voice synchronizer underestimates the required "target holding time," jitter buffer underflow will likely result. However, jitter buffer underflow could also occur at the end of a talk spurt, or during a short silence interval. Therefore, SID packets and sequence numbers could be used to identify what caused the jitter buffer underflow, and whether the target holding time should be increased. If the voice synchronizer overestimates the required "target holding time," all voice frames will be held too long causing jitter buffer overflow. In response to jitter buffer overflow, the target holding time should be decreased. In the described exemplary embodiment, the voice synchronizer increases the target holding time rapidly for jitter buffer underflow due to excessive jitter, but decreases the target holding time slowly when holding times are excessive. This approach allows rapid adjustments for voice quality problems while being more forgiving for excess delays of voice packets.

Thirdly, the voice synchronizer provides a methodology by which frame repeats and frame deletes are performed within the voice decoder. Estimated jitter is only utilized to determine when to release the first frame of a talk spurt. Therefore, changes in the delay variation during the transmission of a long talk spurt must be independently monitored. On buffer underflow (an indication that delay variation is increasing), the voice synchronizer instructs the lost frame recovery engine to issue voice frames repeats. In particular, the frame repeat command instructs the lost frame recovery engine to utilize the parameters from the previous voice frame to estimate the parameters of the current voice frame. Thus, if frames 1, 2 and 3 are normally transmitted and frame 3 arrives late, frame repeat is issued after frame number 2, and if frame number 3 arrives during this period, it is then transmitted. The sequence would be frames 1,2, a frame repeat of frame 2 and then frame 3. Performing frame repeats causes the delay to increase, which increasing the size of the jitter buffer to cope with increasing delay characteristics during long talk spurts. Frame repeats are also issued to replace voice frames that are lost en route.

Conversely, if the holding time is too large due to decreasing delay variation, the speed at which voice frame s are released should be increased. Typically, the target holding time can be adjusted, which automatically compresses the following silent interval. However, during a long talk spurt, it may be necessary to decrease the holding time more rapidly to minimize the excessive end to end delay. This can be accomplished by passing two voice frames to the voice decoder in one decoding interval but only one of the voice frames is transferred to the media queue.

The voice synchronizer functions under conditions of severe buffer overflow, where the physical memory of the signal processing system is insufficient due to excessive delay variation. When subjected to severe buffer overflow, the voice synchronizer could simply discard voice frames.

The voice synchronizer should operate with or without sequence numbers, time stamps, and SID packets. The voice synchronizer should also operate with voice packets arriving out of order and lost voice packets. In addition, the voice synchronizer preferably provides a variety of configuration parameters which can be specified by the host for optimum performance, including minimum and maximum target holding time. With these two parameters, it is possible to use a fully adaptive jitter buffer by setting the minimum target holding time to zero msec and the maximum target holding time to 500 msec (or the limit imposed due to memory constraints). Although the preferred voice synchronizer is fully adaptive and able to adapt to varying network conditions, those skilled in the art will appreciate that the voice synchronizer can also be maintained at a fixed holding time by setting the minimum and maximum holding times to be equal.

5. Lost Packet Recovery/Frame Deletion

In applications where voice is transmitted through a packet based network there are instances where not all of the packets reach the intended destination. The voice packets may either arrive too late to be sequenced properly or may be lost entirely. These losses may be caused by network congestion, delays in processing or a shortage of processing cycles. The packet loss can make the voice difficult to understand or annoying to listen to.

Packet recovery refers to methods used to hide the distortions caused by the loss of voice packets. In the described exemplary embodiment, a lost packet recovery engine is implemented whereby missing voice is filled with synthesized voice using the linear predictive coding model of speech. The voice is modelled using the pitch and spectral information from digital voice samples received prior to the lost packets.

The lost packet recovery engine, in accordance with an exemplary embodiment, can be completely contained in the decoder system. The algorithm uses previous and/or future digital voice samples or a parametric representation thereof, to estimate the contents of lost packets when they occur.

Figure 4:
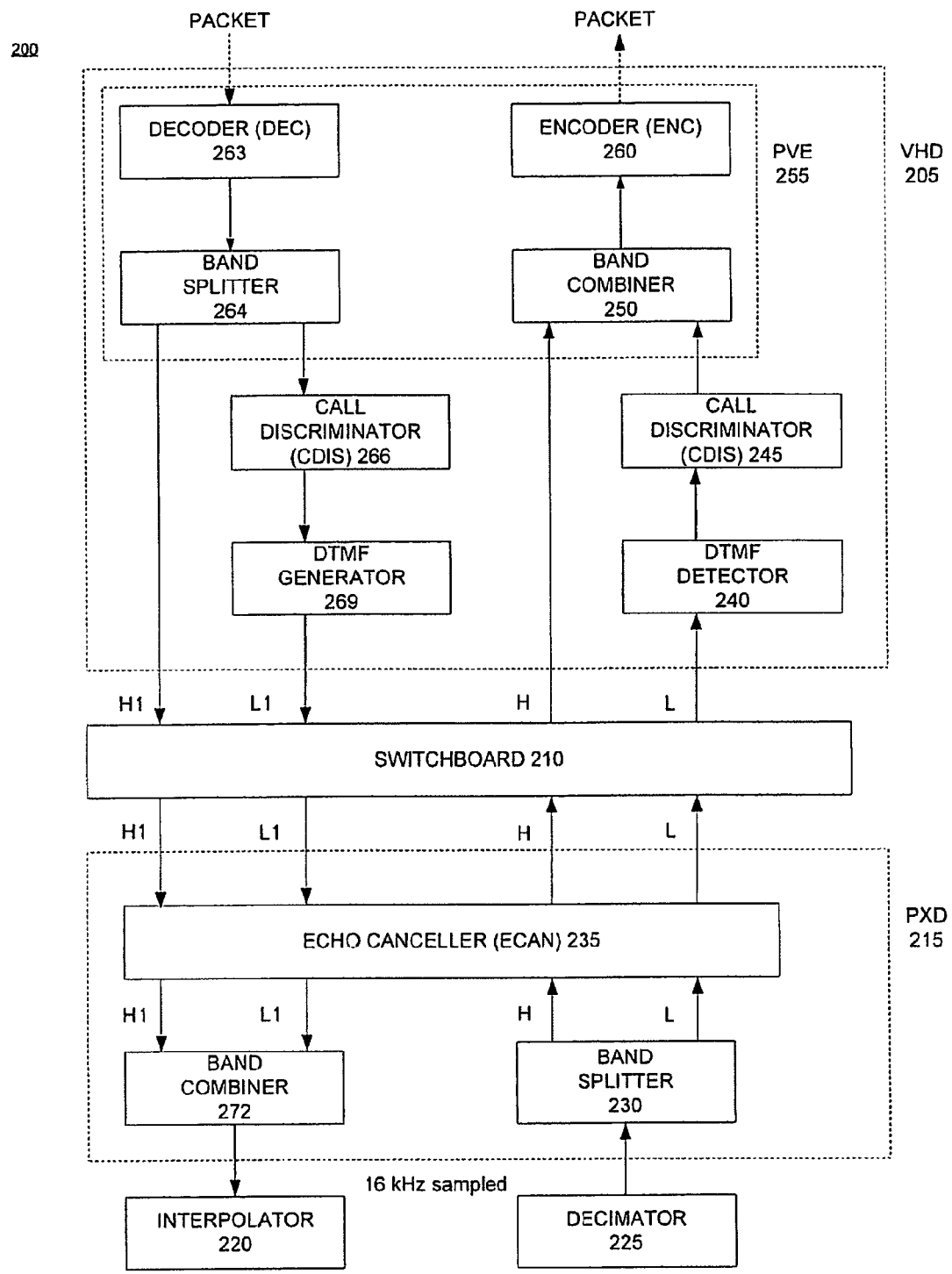
FIG. 4 is a signal flow diagram for a split-band architecture in accordance with an embodiment of the present invention.

Referring now to FIG. 4, there is illustrated a signal flow diagram of a split-band architecture 200 in accordance with an embodiment of the present invention. The split-band architecture 200 includes a Virtual Hausware Driver (VHD) 205, a Switchboard 210, a Physical Device Driver (PXD) 215, an Interpolator 220, and a Decimator 225.

The PXD 215 represents an interface for receiving the input signal from the user and performs various functions, such as echo cancellation. The order of the PXD functions maintains continuity and consistency of the data flow. The top of the PXD 215 is at the switchboard interface. The bottom of the PXD 215 is at the Interpolator 220 and Decimator 225 interface. For wideband operation the split-band/combine PXD function may be located generally as follows. On the switchboard side of this PXD function is split-band data. On the HAL side is single-band data. PXD functions that operate on single-band data, like the side-tone or high-pass PXD functions, are ordered below the split-band/combine PXD function. Other PXD functions that operate on split-band data are ordered above it.

The VHD 205 is a logical interface to the destination terminal 120 via the packet network 115 and performs functions such as Dual Tone Multi Frequency detection and generation, and call discrimination. During a communication (voice, video, fax) between terminals each terminal 120 associates a VHD 205 with the terminal(s) 120 communicating therewith. For example, during a voice over packet network call between two terminals, each terminal 120 associates a VHD 205 with the other terminal 120. The switchboard 210 associates the VHD 205 and the PXD 215 in a manner that will be described below.

A wideband system may contain a mix of narrow and wide band VHDs 205 and PXDs 215. The difference between narrow and wide band device drivers is their ingress and egress sample buffer interface. A wideband VHD 205 or PXD 215 has useful data at its high and low band sample buffer interfaces and can include both narrowband and wideband services and functions. A narrowband VHD 205 or PXD 215 has useful data at its low band interface and no data at its high band interface. The switchboard interfaces with narrow and wide band VHDs 205 and PXDs 215 through their high and low band sample buffer interfaces. The switchboard 210 is incognizant of the wideband or narrowband nature of the device drivers. The switchboard 210 reads and writes data through the sample buffer interfaces. The high and low band sample buffer interfaces may provide data at any arbitrary sampling rate. In an embodiment of the present invention, the low band buffer interfaces provide data sampled at 8 KHz and the high band buffer interface provides data sampled at 16 KHz. Additionally, a VHD 205 can be dynamically changed between wideband and narrowband and vice versa.

The VHD 205 and PXD 215 driver structures add sample rate information to identify the sampling rates of the high and low band data. The information will be part of the interface structure that the switchboard understands and will at least contain a buffer pointer and an enumeration constant or the number of samples to indicate the sample rate.

The split-band architecture 200 is also characterized by an ingress path and an egress path, wherein the ingress path transmits user inputs to the packet network, and wherein the egress path receives packets from the packet network 115. The ingress path and the egress path can either operate in a wideband support mode, or a narrowband mode. Additionally, although the illustrated ingress path and egress path are both operating in the wideband support mode, the ingress path and the egress path are not required to operate in the same mode. For example, the ingress path can operate in the wideband support mode, while the egress path operates in the narrowband mode. In this exemplary embodiment, the ingress path comprises the decimator 225, bandsplitter 264, echo canceller 235, switchboard 210, and services including but limited to Dual-Tone Multi-Frequency (DTMF) detector 240, Call Discriminator (CDIS) 245, and packet voice engine (PVE) 255 comprising a combiner 250 and an encoder algorithm 260.

The decimator 225 receives the user inputs and provides 16 Khz sampled data for an 8 KHz bandlimited signal. The 16 KHz sampled data is received by the bandsplitter 264. The bandsplitter 264 splits the 8 KHz bandwidth signal into a low band (L) and a high band (H). The low band L and high band H are transmitted through the echo canceller 235, and switchboard 210 to the VHD 205 associated with the destination terminal 120. The bandsplitter can comprise the bandsplitter described in the co-pending application Ser. No. 60/414,491, "Splitter and Combiner for Multiple Data Rate Communication System", which is incorporated by reference in its entirety.

The VHD 205 receives the low band L and high band H. Because DTMF detector typically requires narrowband digitized samples, only the low band is passed through a DTMF detector 240 configured to detect DTMF signals. Likewise, because the CDIS 245 typically requires narrowband digitized samples, only the low band is provided to CDIS 245 which distinguishes a voice call from a facsimile transmission. The low band L and high band H are combined at a combiner 250 in packet voice engine 255. The combiner can comprise a combiner described in the co-pending application Ser. No. 60/414,491, "Splitter and Combiner for Multiple Data Rate Communication System", which is incorporated by reference herein in its entirety. Combining may comprise, for example, upsampling, adding, overwriting, and switching, or in some cases nothing at all, or any combination thereof, depending on the service involved.

The PVE 255 is responsible for issuing media queue mode change commands consistent with the active encoder and decoder. The media queues can comprise the media queues described in the co-pending application Ser. No. 60/414,492, "Method and System for an Adaptive Multimode Media Queue", which is incorporated by reference herein in its entirety.

The PVE 255 ingress thread receives raw samples. The raw samples consist of both low and high band data. However, to save memory only low band data is forwarded when the VHD 205 is operating in narrowband mode. Both low and high band data are concatenated together and forwarded when operating in wideband mode.

At the packet voice engine 255, encoder 260 packetizes the combined signal for transmission over the packet network 115. The encoder 260 can comprise, for example, the Broad-Voice 32 Encoder made by Broadcom, Inc.

The egress path comprises decoder 263, bandsplitter 264, CDIS 266, DTMF generator 269, switchboard 210, echo canceller 235, band combiner 250, and interpolator 220. The decoder 263 receives data packets from the packet network 115. The decoder 263 can comprise the BroadVoice 32 Decoder made by Broadcom, Inc. The decoder 263 decodes data packets received from the packet network 115 and provides 16 KHz samples. The 16 KHz samples are provided to bandsplitter 264, which separates a low band, L1 from a high band, H1. Again, because the CDIS 266 and the DTMF Generator 269 utilize narrowband digitized samples, only the low band is used by CDIS 266 and the DTMF Generator 269.

The DTMF generator 269 generates DTMF tones if detected from the sending terminal 120. These tones are written to the low band L1. The low band, L1, and high band H1 are received by the switchboard 210. The switchboard 210 provides the low band L1 and high band H1 to the PXD 215. The low band L1 and high band H1 are passed through the echo canceller 235 and provided to the band combiner 250 which combines the low band L1, and high band H1. The combined low band L1, and high band H1 are provided to interpolator 220. The interpolator 220 provides 16 KHz samples.

The low band is stored as 8 kHz sampled data, while the high band is stored as 16 kHz sampled data. In one embodiment, both bands are not stored symmetrically as 8 kHz sampled data because the 8 kHz bandwidth is not split symmetrically down the center. This design incurs a memory cost in return for voice quality and G.712 compliance. Alternatively, if aliasing may be ignored the 8 kHz bandwidth may be split symmetrically with both low and high bands stored as 8 kHz sampled data. This alternative embodiment avoids the increased memory requirement but at the cost of voice quality. Both symmetric and asymmetric split-band architectures are similar in implementation except for the sampling rate of the media streams. In some designs, one may be more desirable. In other designs, the reverse may be true. The optimal choice depends on an acceptable memory versus performance trade-off.

Figure 5:
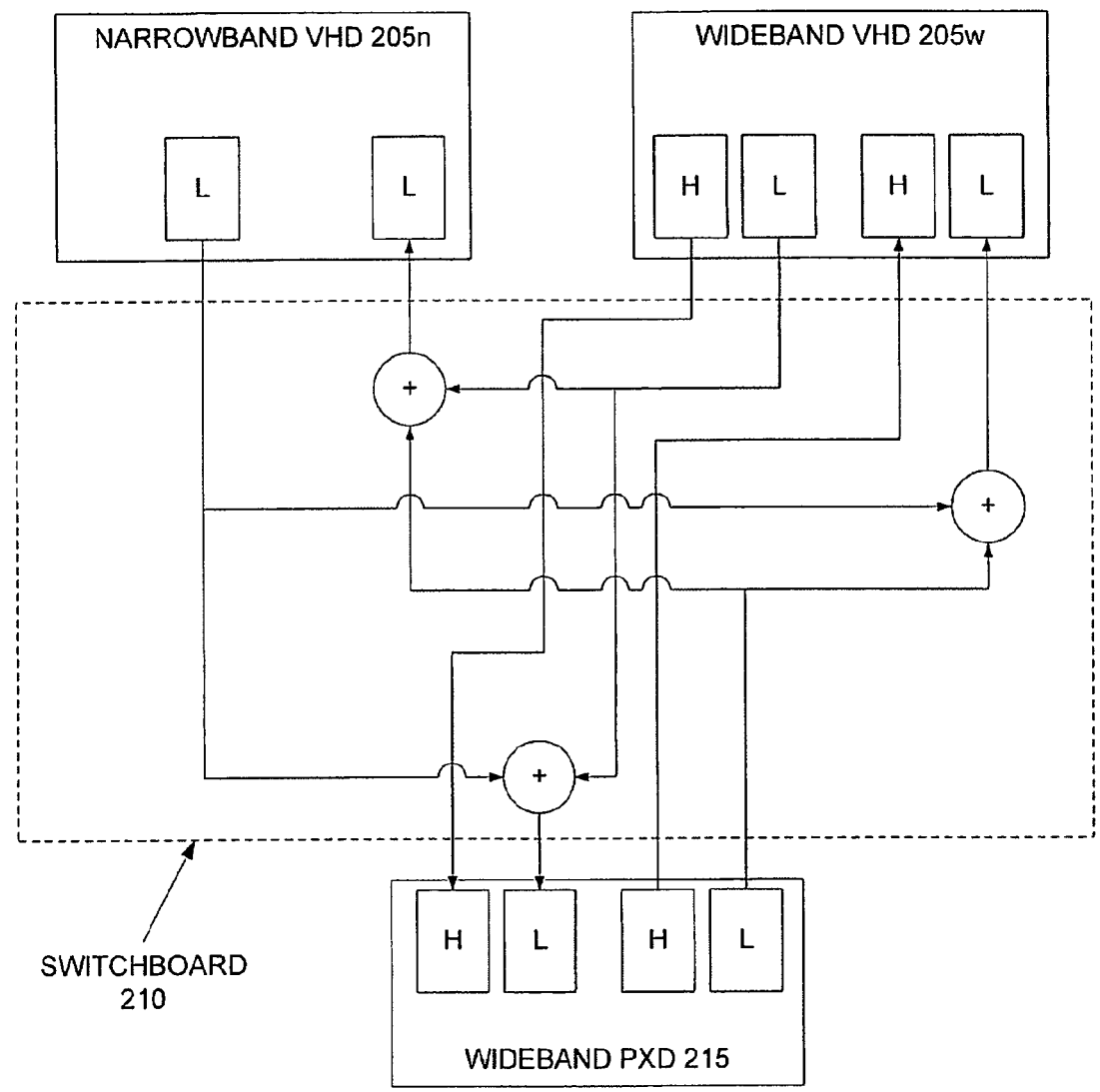
FIG. 5 is a block diagram of a split-band configuration for an exemplary conference call in accordance with an embodiment of the present invention.

Referring now to FIG. 5, there is illustrated a block diagram of a split-band configuration for an exemplary conference call involving a first wideband terminal 120, a second wideband terminal 120, and narrow band terminal 120, wherein the first wideband terminal 120 is the conference call host. A wideband PXD 215 is associated with the first wideband terminal 120, a wideband VHD 205$w$ is associated with the second wideband terminal 120, and a narrowband VHD 205$n$ is associated with the narrowband terminal 120. The narrow band terminal 120 only transmits on the low band, L, while the wideband terminals 120 transmit on both the low L and the high bands H.

In the ingress direction relative to the first wideband terminal 120, the switchboard 210 provides the low band signal L from wideband PXD 215 to both VHDs 205$w$, 205$n$. However, the switchboard 210 only provides the high band signal H from wideband PXD 215 to the wideband VHD 205$w$ because the narrowband VHD 205$n$ does not support wideband signaling. In the egress direction, the switchboard 210 receives and sums the low band signals L from the VHDs 205$w$ and 205$n$, and provides the summed low band signal to PXD 215. However, the switchboard 210 only provides the high band signal H from wideband VHD 205$w$ to the wideband PXD 215 because the narrowband VHD 205$n$ does not support wideband signaling. The switchboard can comprise, for example, the switchboard described in the co-pending application Ser. No. 60/414,493, "Switchboard for Multiple Data Rate Communication System", which is incorporated by reference herein in its entirety.

Figure 5A:
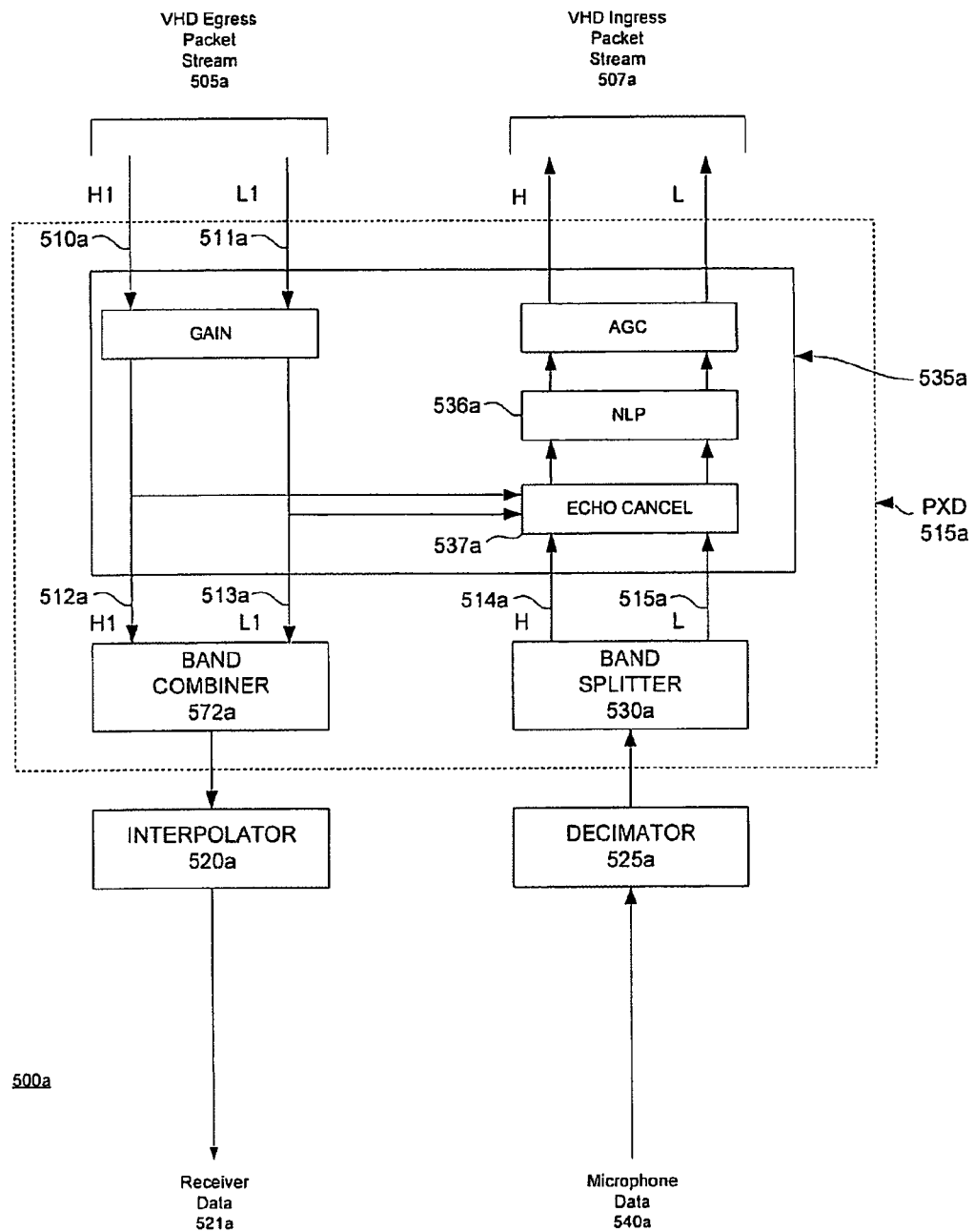
FIG. 5A illustrates a more detailed block diagram showing the signal flow for a portion of the split-band architecture shown in FIG. 4 in an exemplary terminal such as the terminal of FIG. 2, in accordance with an embodiment of the present invention.

Referring now to FIG. 5A there is illustrated a more detailed block diagram showing the signal flow for a portion of the split-band architecture shown in FIG. 4 in an exemplary terminal such as the terminal 120 of FIG. 2, in accordance with an embodiment of the present invention. The illustration of FIG. 5A comprises a PXD 515$a$, an interpolator 520$a$, and a decimator 525$a$. The PXD 515$a$, the interpolator 520$a$, and the decimator 525$a$ of FIG. 5A may correspond, for example, to the PXD 215, the interpolator 220, and the decimator 225 of FIG. 4, respectively. As shown in FIG. 5A, the PXD 515$a$ comprises the echo canceller 535$a$, the band combiner 572$a$, and the band-splitter 530$a$.

The embodiment of the present invention shown in FIG. 5A may be characterized as having an egress path and an ingress path. The components shown in the egress path of FIG. 5A comprise the echo canceller 535$a$, the band combiner 572$a$, and the interpolator 520$a$. The functionality of these elements may correspond, for example, to the functionality of the echo canceller 235, the band combiner 250, and the interpolator 220 of FIG. 4. The components of the ingress path of FIG. 5A comprise a decimator 525$a$, a band-splitter 530$a$, and the echo canceller 535$a$. The functionality of these elements may correspond, for example, to the functionality of the decimator 225, the band-splitter 230, and the echo canceller 235 of FIG. 4.

When engaged in communication with a wideband terminal such as, for example, the terminal 120 of FIG. 2, the low and high band egress signals, H1 510$a$ and L1 511$a$, carry the digital representation of the speech energy in the low (0-4 KHz) and high band (4-8 KHz) portions of the speech signal, respectively. As described above, that information may be provided to PXD 515$a$ from a switchboard such as, for example, the switchboard 210 of FIG. 2. The echo canceller 535$a$ passes the low and high band signals, L1 511$a$ and H1 510$a$, to the band combiner 572$a$. The band combiner then delivers a combined egress speech signal to the interpolator 520$a$. The interpolator 520$a$ provides the interpolated, combined egress speech signal to the receiver circuitry of, for example, a terminal handset (not shown) via receiver data 521$a$. Speech signals from, for example, the microphone of such a terminal handset are received by the decimator 525$a$ as microphone data 540a. The decimator 525a passes the microphone data 540a to the band-splitter 530a. The low and high band spectral components of the decimated microphone data 540a, L 515a and H 514a, are then processed by the echo canceller 535a.

During the operation of a terminal such as, for example, the terminal 120 of FIG. 2, a portion of the egress speech signal represented by receiver data 521a may be introduced into the ingress speech path, represented in FIG. 5A as microphone data 540a. In the case of a terminal such as the terminal 120 of FIG. 2, this may be acoustic echo of the far-end speech that is caused by room acoustics at the near-end. Acoustic echo is a common telephony problem, particularly when speakerphones are used. In such an environment, the echo cancellation function 537a of FIG. 5A may be unable to cancel the entire echo. A non-linear processor (NLP) such as, for example, the NLP 536a may be used to suppress the residual echo during periods of far-end active speech, when there is no near-end speech. The operation of such a configuration was described above with respect to FIGS. 3 and 4, above. Although echo cancellation is described in the context of a signal processing system for packet voice exchange, the techniques described for echo cancellation in the split band system of the present invention are likewise suitable for various applications requiring the cancellation of reflections, or other undesirable signals, from a transmission line. Accordingly, the described exemplary embodiment for echo cancellation in a signal processing system is by way of example only and not by way of limitation.

In the described exemplary embodiment of FIG. 5A, the echo canceller may comply with one or more of the following International Telecommunications Union—Telecommunications Standardization Sector (ITU-T) Recommendations G.164 (1988)—Echo Suppressors, G.165 (March 1993)—Echo Cancellers, G.167 (March 1993)—Acoustic Echo Controllers, and G.168 (April 1997)—Digital Network Echo Cancellers, the contents of which are incorporated herein by reference as though set forth in full. An embodiment of the present invention merges echo cancellation and echo suppression methodologies to more effectively remove acoustic echo that may occur in a split-band telecommunication system. Typically, echo cancellers are favored over echo suppressors for superior overall performance in the presence of system noise such as, for example, background music, double talk etc., while echo suppressors tend to perform well over a wide range of operating conditions where clutter such as system noise is not present. An embodiment of the present invention provides improved echo suppression in split-band systems operating in narrowband mode.

In an embodiment of the present invention, the presence of speech energy in the high band signal 514a is used to enhance the operation of the NLP 536a when in communication with a narrowband terminal such as, for example, the terminal 120 of FIG. 2 operating in narrowband mode. When operating in narrowband mode, the spectral content of the terminal 120 is limited to low band signals only (i.e., 0-4 KHz), and the speech signal represented by the low band signal, L1 511a, contains speech energy. The low band signal, L1 513a, and the signals represented by the output of the band combiner 572a, and interpolator 520a also contain low band, but no high band spectral content. In narrowband mode, however, the high band signal, H1 510a, does not contain a representation of active speech signals. Therefore, the spectral content of any echo of egress speech signals generated by the acoustical environment at the near end is primarily limited to the low band.

In the exemplary embodiment of the present invention shown in FIG. 5A, the speech signal represented by microphone data 540a is primarily composed of the speech signal originating from the microphone of the near-end terminal. In narrowband mode, the signal represented by the receiver data 521a is absent of high band spectral content. Any acoustic echo is therefore limited to the low band spectrum. The low band spectral content of the signal represented by microphone data 540a includes the acoustic echo of the signal represented by receiver data 521a, and the speech signals originating from the party/parties using the near-end terminal. Therefore, while operating with a narrowband far-end party, any high band spectral energy present in the signal represented by the microphone data 540a necessarily originates from the acoustical environment (i.e., participants, room noise, etc.) at the near-end terminal. An embodiment of the present invention uses the presence of high band energy in the microphone data 540a to make a more accurate determination of the occurrence of near-end speech. The improvement in voice activity detection (VAD) provided by an embodiment of the present invention permits a more accurate determination of when the NLP 536a in FIG. 5A is to be enabled, and allows such an embodiment to reduce the level of echo experienced by the far-end party.

Figure 5B:
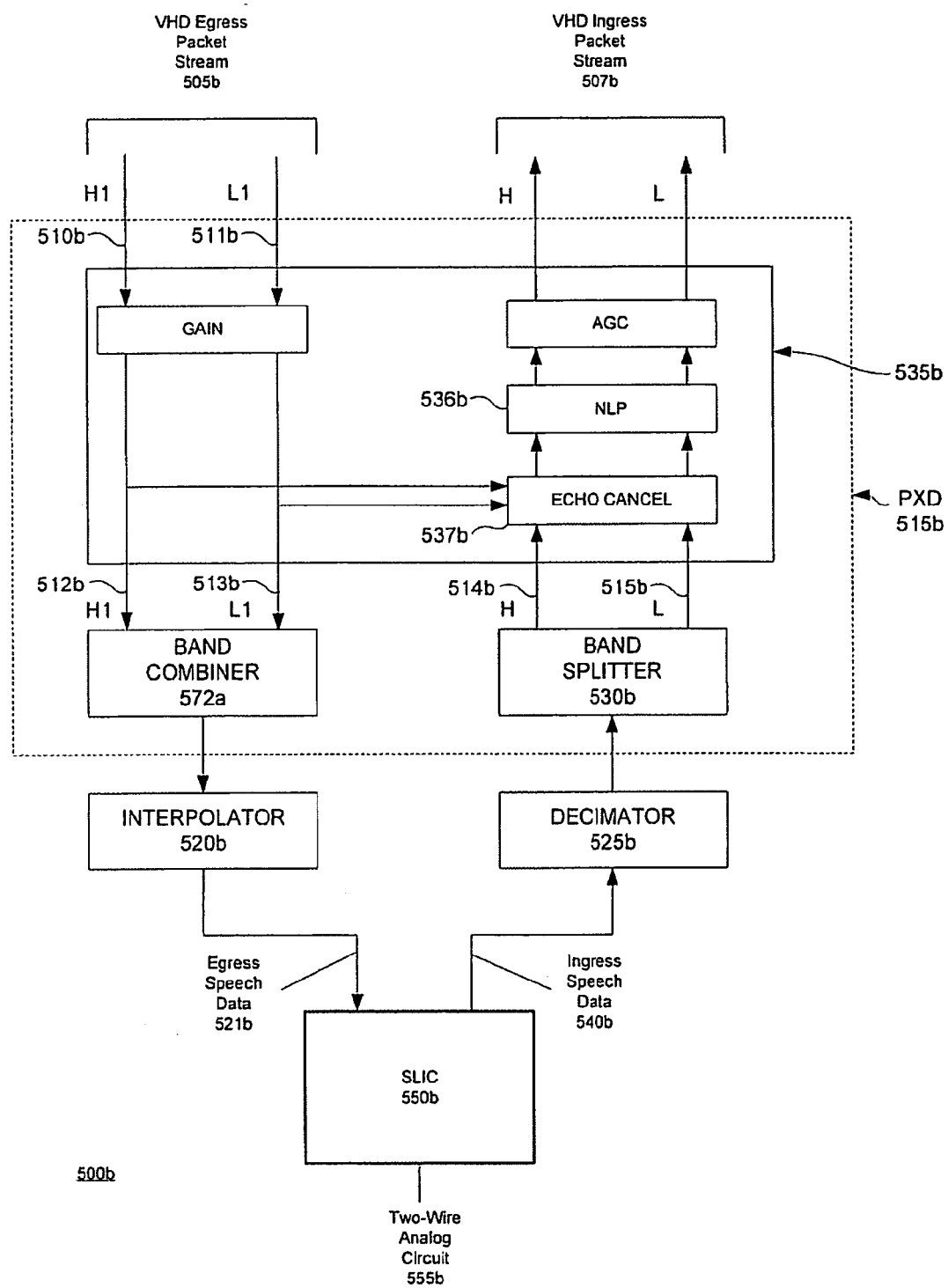
FIG. 5B illustrates a more detailed block diagram showing the signal flow for a portion of the split-band architecture shown in FIG. 4 of an exemplary gateway device, in accordance with an embodiment of the present invention.

Referring now to FIG. 5B there is illustrated a more detailed block diagram showing the signal flow for a portion of the split-band architecture shown in FIG. 4 of an exemplary gateway device 500b, in accordance with an embodiment of the present invention. The gateway device 500b of FIG. 5B may be used to interface traditional telephone station set equipment to a packet switched voice network, such as the packet network 115 of FIG. 2. The illustration of FIG. 5B comprises a PXD 515b, an interpolator 520b, and a decimator 525b. The PXD 515b, the interpolator 520b, and the decimator 525b of FIG. 5B may correspond, for example, to the PXD 215, the interpolator 220, and the decimator 225 of FIG. 4, respectively. As shown in FIG. 5B, the PXD 515b comprises the echo canceller 535b, the band combiner 572b, and the band-splitter 530b. In addition to the components shown in FIG. 4, the illustration of FIG. 5B also shows a subscriber line interface circuit (SLIC) 550b. The SLIC 550b is used to convert from the four-wire configuration of a packet network such as, for example, the packet network 115 of FIG. 2, and the two-wire analog circuit 555b used to interface a traditional analog telephone instrument. The use of the SLIC 550b is also applicable to the embodiment of the present invention that is shown in FIG. 4. It is included in FIG. 5B to aid in more clearly describing the operation of the embodiment of the present invention, below.

The embodiment of the present invention shown in FIG. 5B may be characterized as having an egress path and an ingress path. The components shown in the egress path of FIG. 5B comprise the echo canceller 535b, the band combiner 572b, the interpolator 520b, and the SLIC 550b. The functionality of these elements may correspond, for example, to the functionality of the echo canceller 235, the band combiner 250, and the interpolator 220 of FIG. 4. The components of the ingress path of FIG. 5B comprise the SLIC 550b, a decimator 525b, a band-splitter 530b, and the echo canceller 535b. The functionality of these elements may correspond, for example, to the functionality of the decimator 225, the band-splitter 230, and the echo canceller 235 of FIG. 4.

When engaged in communication with a wideband terminal such as, for example, terminal 120 of FIG. 2, the low and high band egress signals, H1 510b and L1 511b, carry the digital representation of the speech energy in the low (0-4 KHz) and high band (4-8 KHz) portions of the speech signal, respectively. As described above, that information may be provided to PXD 515*b* from a switchboard such as, for example, the switchboard 210 of FIG. 2. The echo canceller 535*b* passes the low and high band signals, L1 511*b* and H1 510*b*, to the band combiner 572*b*. The band combiner then delivers a combined egress speech signal to the interpolator 520*b*. The interpolator 520*b* provides the interpolated, combined egress speech signal 521*b* to SLIC 550*b*, for transmission to the two-wire analog circuit 555*b*. Analog signals originating on the two-wire analog circuit 555*b* are coupled by SLIC 550*b* to the decimator 525*b* as ingress speech data 540*b*. The decimator 525*b* passes the ingress speech data 540*b* to the band-splitter 530*b*. The low and high band spectral components of the decimated, ingress speech data 540*b*, L 515*b* and H 514*b*, are then processed by the echo canceller 535*b*.

The operation of the SLIC 550*b* typically permits a small amount of the egress speech signal represented by egress speech data 521*b* to "leak" into the ingress speech path, represented in FIG. 5B as ingress speech data 540*b*. This leakage, referred to as "hybrid echo" or "line echo", results from the four-wire to two-wire conversion that takes lace in the hybrid circuit of the SLIC 550*b*, and is a common telephony problem. In addition, acoustic echo as described above with respect to FIG. 5A may be present. The operation of the echo cancellation function 537*b* in FIG. 5B may not identically model the transfer characteristics of the two-wire analog circuit 555*b*, or the nature of the acoustic echo, if present. This may be for a variety of reasons including, for example, non-linearities in the hybrid circuitry, estimation errors, noise in the system, and variations in the impedance of the two-wire analog circuit 555*b* and far-end subscriber station set. The echo cancellation function 537*b* of FIG. 5B may therefore be unable to cancel the entire echo. A non-linear processor (NLP) such as, for example, the NLP 536*b* may be used to suppress the residual echo during periods of far-end active speech, when there is no near-end speech. Suppression of the remaining echo may comprise attenuation of the ingress speech signal represented by the ingress speech data 540*b*, the removal of the ingress speech signal and injection of comfort noise, or a combination of the two. The operation of such a configuration was described above with respect to FIGS. 3 and 4, above. Although echo cancellation is described here in the context of a signal processing system for packet voice exchange, the techniques described for echo cancellation in the split band system of the present invention are likewise suitable for various applications requiring the cancellation of reflections, or other undesirable signals, from a transmission line. Accordingly, the described exemplary embodiment for echo cancellation in a signal processing system is by way of example only and not by way of limitation.

In the described exemplary embodiment of FIG. 5B, the echo canceller may comply with one or more of the following International Telecommunications Union—Telecommunications Standardization Sector (ITU-T) Recommendations G.164 (1988)—Echo Suppressors, G.165 (March 1993)—Echo Cancellers, G.167 (March 1993)—Acoustic Echo Controllers, and G.168 (April 1997)—Digital Network Echo Cancellers, the contents of which are incorporated herein by reference as though set forth in full. An embodiment of the present invention merges echo cancellation and echo suppression methodologies to more effectively remove the hybrid and acoustic echoes that may be present in a split-band telecommunication system. Typically, echo cancellers are favored over echo suppressors for superior overall performance in the presence of system noise such as, for example, background music, double talk etc., while echo suppressors tend to perform well over a wide range of operating conditions where clutter such as system noise is not present. An embodiment of the present invention provides improved echo suppression in split-band systems operating in narrowband mode.

In an embodiment of the present invention, the presence of speech energy in the high band signal 514*b* is used to enhance the operation of the NLP 536*b* when in communication with a narrowband terminal such as, for example, the terminal 120 of FIG. 2 operating in narrowband mode. When operating in narrowband mode, the spectral content of the terminal 120 is limited to low band signals only (i.e., 0-4 KHz), and the speech signal represented by the low band signal, L1 511*b*, contains speech energy. The low band signal, L1 513*b*, and the signals represented by the output of the band combiner 572*b*, and interpolator 520*b* also contain low band, but no high band spectral content. In narrowband mode, however, the high band signal, H1 510*b*, does not contain a representation of active speech signals. Therefore, the spectral content of any acoustic echo or leakage of egress speech signals generated by the hybrid circuit of SLIC 550*b* is limited to the low band.

In the exemplary embodiment of the present invention shown in FIG. 5B, the speech signal represented by ingress speech data 540*b* is primarily composed of the speech signal originating from the two-wire analog circuit 555*b*, and the hybrid leakage of SLIC 550*b*. In narrowband mode, the signal represented by the egress speech data 521*b* is absent of high band spectral content. Any acoustic echo, or hybrid leakage generated by SLIC 550*b* is therefore limited to the low band spectrum. The low band spectral content of the signal represented by ingress speech data 540*b* includes the hybrid leakage from SLIC 550*b* of the signal represented by egress speech data 521*b*, the near-end speech signal originating from the two-wire analog circuit 555*b* (including any acoustic echo), and any noise generated by the non-linearity of the circuitry of the SLIC 555*b*. Therefore, while operating with a narrowband far-end party, any high band spectral energy present in the signal represented by the ingress speech data 540*b* necessarily originates either from the two-wire analog circuit 555*b* (i.e., the near-end subscriber station set), or from non-linearities in the SLIC 550*b*. An embodiment of the present invention uses the presence of high band energy in the ingress speech data 540*b* to make a more accurate determination of the occurrence of near-end speech. The improvement in voice activity detection (VAD) provided by an embodiment of the present invention permits a more accurate determination of when the NLP 536*b* in FIG. 5B is to be enabled, and allows such an embodiment to reduce the level of acoustic and hybrid echo experienced by the far-end.

Although the exemplary embodiments of FIG. 5A and FIG. 5B have been with respect to the cancellation of acoustic or hybrid echo, an embodiment of the present invention provides improved performance in other applications. For example, an embodiment of the present invention may be used to improve the performance of the VAD 80 shown in the exemplary signal processing system of FIG. 3. By providing more accurate detection of voice activity, an embodiment in accordance with the present invention allows the VAD 80 to contribute to improved operation of the comfort noise estimator 81, and provides a more accurate indication of speech activity to packetization engine 78 via "active" flag 80*a*. In particular, an embodiment of the present invention may provide significant improvement in voice activity detection for speech. sounds containing little or no low band energy, but somewhat higher levels of high band energy. For example, the sibilant /s/ in words such as "cats".

Figure 5C:
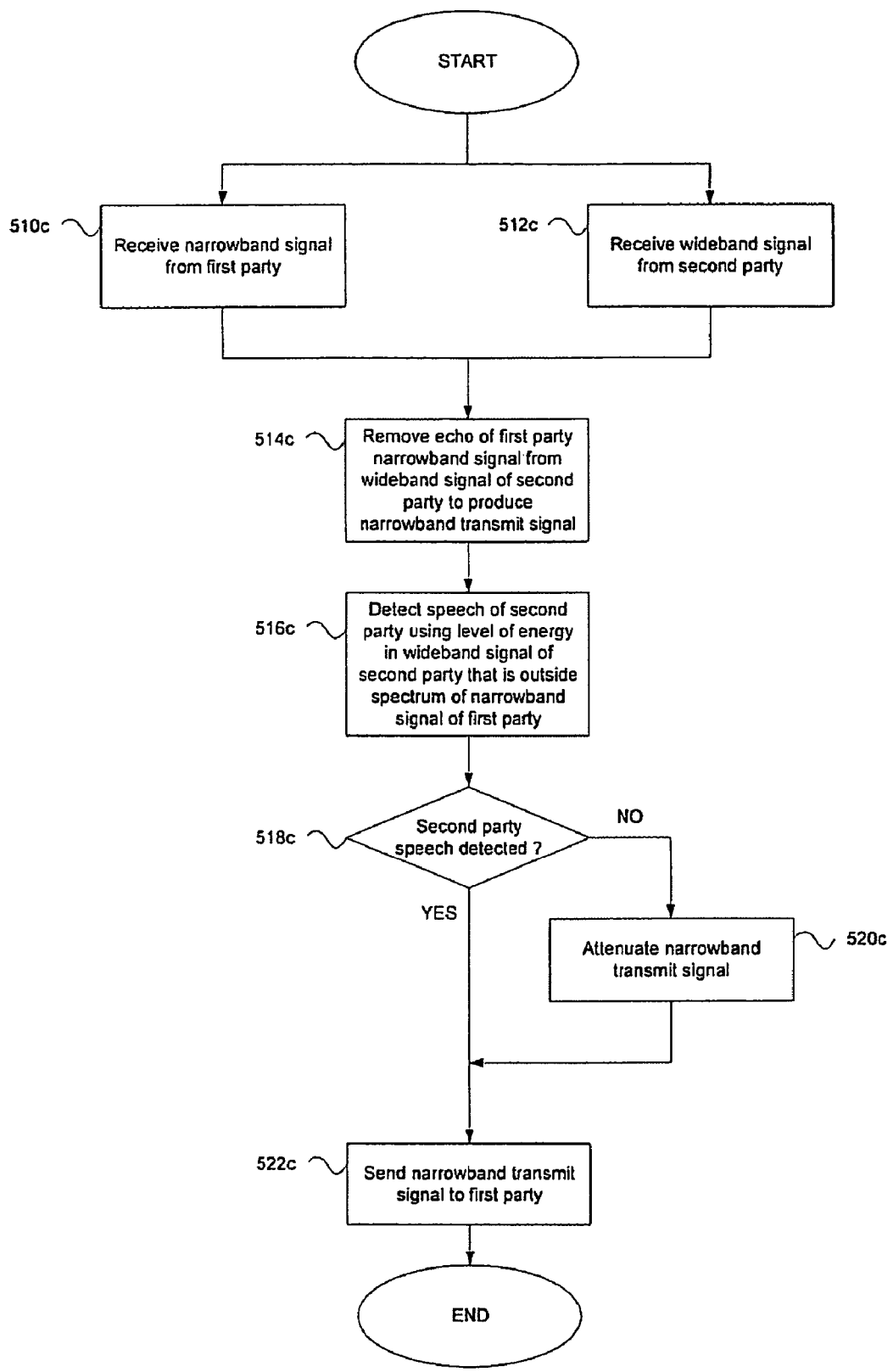
FIG. 5C illustrates a flowchart showing an exemplary method of performing echo cancellation and suppression, in accordance with an embodiment of the present invention.

Referring now to FIG. 5C there is illustrated a flowchart showing an exemplary method of performing echo cancellation and suppression, in accordance with an embodiment of the present invention. The method illustrated in FIG. 5C may correspond, for example, to the operation of the split-band signal processing apparatus shown in FIGS. 5A or 5B. The method shown in FIG. 5C begins with the reception of a narrowband signal from a first party (block 510c), and a wideband signal from a second party (block 512c). The narrowband and wideband signals may correspond, for example, to the signals represented by the VHD egress packet stream 505a, 505b, and the ingress speech data 540b or microphone data 540b of FIGS. 5A and 5B, respectively. The diagram of FIG. 5C shows the two activities in parallel to illustrate that the two signals may be received concurrently. Next, a narrowband transmit signal is produced by removing echo of the narrowband signal received from the first party from the wideband signal received from the second party (block 514c). For reasons explained above, the narrowband transmit signal may contain echo of the narrowband signal received from the first party. To aid in the suppression of any echo of the received narrowband signal from the first party, the method of FIG. 5C then detects energy in that portion of the spectrum contained in the wideband signal received from the second party that is not present in the narrowband signal received from the first party (block 516c). As described above with respect to FIGS. 5A and 5B, this energy originates primarily from the speech of the second party. If the level of energy in that portion of the wideband signal from the second party outside the narrowband signal of the first party exceeds a predetermined level, then second party speech may be considered to be present, and the narrowband transmit signal may be sent to the first party unchanged (block 522c). If, however, the level of energy in that portion of the wideband signal from the second party outside the narrowband signal of the first party is less than the predetermined level, then second party speech may be considered to not be present, and the narrowband transmit signal may be processed or modified, to further suppress the audibility of any remaining echo of speech from the first party that remains in the narrowband transmit signal (block 520c). Processing or modification of the narrowband transmit signal may comprise attenuation of the narrowband transmit signal, removal of the narrowband transmit signal and injection of comfort noise, or a combination of the two. The modified narrowband transmit signal is then sent to the first party (block 522c).

Although the present invention has been described in relation to its use in the operation of the voice activity detection functionality of an echo canceller, a comfort noise estimator, and a packetization engine, the above discussion has been with regard to explanation, and is not intended to limit the scope of the present invention. An embodiment of the present invention may more accurately detect the occurrence of speech signals in any of a number of application by using a signal characteristic such as, for example, the existence of spectral components outside the frequency band to be communicated. An embodiment of the present invention may also have application in other systems where the detection of a signal may be enhanced using various signal characteristics outside of the bandwidth to be communicated.

Figure 6:
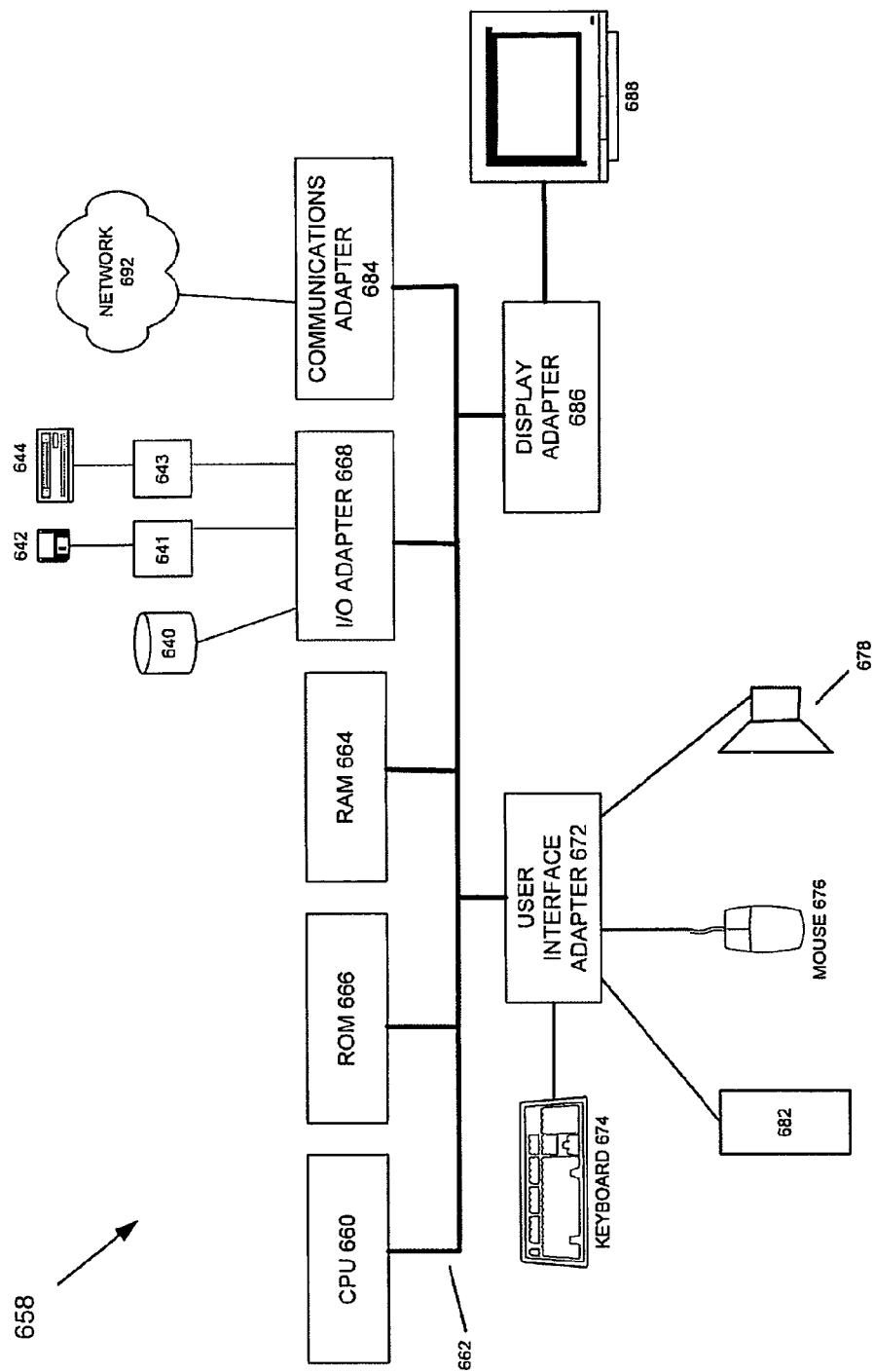
FIG. 6 illustrates a block diagram of an exemplary terminal, in which an embodiment of the present invention may be practiced.

Referring now to FIG. 6, there is illustrated a block diagram of an exemplary terminal 120, in which an embodiment of the present invention may be practiced. In the illustration of FIG. 6, a processor 660 is interconnected via system bus 662 to random access memory (RAM) 664, read only memory (ROM) 666, an input/output adapter 668, a user interface adapter 672, a communications adapter 684, and a display adapter 686. The input/output adapter 668 connects peripheral devices such as hard disc drive 640, floppy disc drives 641 for reading removable floppy discs 642, and optical disc drives 643 for reading removable optical disc 644. The user interface adapter 672 connects devices such as a keyboard 674, a speaker 678, a microphone 682, optical scanner 684, and printer 686 to the bus 662. The microphone 682 generates audio signals that are digitized by the user interface adapter 672. The speaker 678 receives audio signals that are converted from digital samples to analog signals by the user interface adapter 672. The display adapter 686 connects a display 688 to the bus 662.

An embodiment of the present invention can be implemented as sets of instructions resident in the RAM 664 or ROM 666 of one or more terminals 120 configured generally as described in FIG. 2. Until required by the terminal 120, the set of instructions may be stored in another memory readable by the processor 660, such as hard disc drive 640, floppy disc 642, or optical disc 644. One skilled in the art would appreciate that the physical storage of the sets of instructions physically changes the medium upon which it is stored electrically, magnetically, or chemically so that the medium carries information readable by a processor.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. One or more circuits for a communication system, the one or more circuits comprising:
   at least one processor operable to, at least:
   receive a first signal having spectral components within a first frequency band; accept a second signal having spectral components in a second frequency band extending beyond the first frequency band;
   remove a modified version of the first signal from the second signal to produce a third signal; and
   process the third signal based upon a level of spectral components of the second signal extending beyond the first frequency band.

2. The one or more circuits of claim 1 wherein the first frequency band comprises from approximately 0 Hz to approximately 4 KHz.

3. The one or more circuits of claim 1 wherein the second frequency band comprises from approximately 4 KHz to approximately 8 KHz.

4. The one or more circuits of claim 1 wherein the first frequency band and the second frequency band are essentially non-overlapping.

5. The one or more circuits of claim 1 wherein the modification of the first signal comprises at least one of delaying and attenuating.

6. The one or more circuits of claim 1 wherein the processing comprises:
   attenuating the third signal when the level of spectral components of the second signal in the second frequency band is below a predetermined level; and
   refraining from attenuating the third signal when the level of spectral components of the second signal in the second frequency band is at or above the predetermined level.

7. The one or more circuits of claim 1 wherein the communication system comprises a packet network.

8. One or more circuits for use in a communication system comprising a plurality of communication terminals operating in one of a narrowband mode and a wideband mode, the wideband mode supporting wideband signals with spectral components comprising and extending beyond the spectral components of narrowband signals supported by communication terminals operating in the narrowband mode, the one or more circuits comprising:
at least one processor comprising at least one interface for operably coupling to a first communication terminal operating in narrowband mode and a second communication terminal operating in wideband mode, the at least one processor operable to, at least:
receive a narrowband first signal from the first communication terminal;
receive a wideband second signal from the second communication terminal;
detect voice activity in the second signal using a level of energy of spectral components of the second signal outside of the spectral components of the first signal;
process the second signal to produce a narrowband transmit signal; and
transmit the processed transmit signal to the first communication terminal.

9. The one or more circuits of claim 8 wherein the at least one processor is operable to, at least:
adjust operation of a comfort noise estimator according to the detection of voice activity.

10. The one or more circuits of claim 8 wherein the at least one processor adjusts parameters used in comfort noise estimation, based on the level of energy of spectral components of the second signal outside of the spectral components of the first signal.

11. The one or more circuits of claim 8 wherein the at least one processor is operable to, at least:
adjust packetization of the processed second signal according to the detection of voice activity.

12. The one or more circuits of claim 8 where the first signal comprises spectral components from approximately 0 Hz to approximately 4 KHz.

13. The one or more circuits of claim 8 wherein the second signal comprises spectral components from approximately 0 KHz to approximately 8 KHz.

14. The one or more circuits of claim 8 wherein the processing of the first signal comprises at least one of delaying and attenuating.

15. The one or more circuits of claim 8 wherein the communication system comprises a packet network.

16. One or more circuits for use in a communication terminal, the one or more circuits supporting voice communication with communication terminals using wideband signals and narrowband signals, the wideband signals having spectral components comprising and extending beyond the spectral components of the narrowband signals, the one or more circuits comprising:
at least one processor comprising at least one interface for operably coupling to a first communication terminal operating in narrowband mode, the at least one processor operable to, at least:
receive, via a communication network, a narrowband first signal from the first communication terminal;
receive a wideband second signal from a microphone at a second communication terminal;
detect voice activity in the second signal using a level of energy of spectral components of the second signal outside of the spectral components of the first signal;
process the second signal to produce a narrowband transmit signal; and
transmit the processed transmit signal to the first communication terminal.

17. The one or more circuits of claim 16 wherein the at least one processor is operable to, at least:
adjust operation of a comfort noise estimator according to the detection of voice activity.

18. The one or more circuits of claim 16 wherein the at least one processor adjusts parameters used in comfort noise estimation, based on the level of energy of spectral components of the second signal outside of the spectral components of the first signal.

19. The one or more circuits of claim 16 wherein the at least one processor is operable to, at least:
adjust packetization of the processed second signal according to the detection of voice activity.

20. The one or more circuits of claim 16 where the first signal comprises spectral components from approximately 0 Hz to approximately 4 KHz.

21. The one or more circuits of claim 16 wherein the second signal comprises spectral components from approximately 0 KHz to approximately 8 KHz.

22. The one or more circuits of claim 16 wherein the processing of the first signal comprises at least one of delaying and attenuating.

23. The one or more circuits of claim 16 wherein the communication network comprises a packet network.

* * * * *